(12) United States Patent
Fukushima et al.

(10) Patent No.: US 8,982,155 B2
(45) Date of Patent: Mar. 17, 2015

(54) AUGMENTED REALITY PROVIDING SYSTEM, INFORMATION PROCESSING TERMINAL, INFORMATION PROCESSING APPARATUS, AUGMENTED REALITY PROVIDING METHOD, INFORMATION PROCESSING METHOD, AND PROGRAM

(75) Inventors: Tetsuji Fukushima, Toko (JP); Shigeo Kuwabara, Tokyo (JP); Satoshi Yokoi, Tokyo (JP); Noboru Ihara, Tokyo (JP)

(73) Assignee: NS Solutions Corporation, Tokyo (JP)

( * ) Notice: Subject to any disclaimer, the term of this patent is extended or adjusted under 35 U.S.C. 154(b) by 0 days.

(21) Appl. No.: 13/504,457

(22) PCT Filed: Aug. 18, 2011

(86) PCT No.: PCT/JP2011/068657
§ 371 (c)(1),
(2), (4) Date: Apr. 26, 2012

(87) PCT Pub. No.: WO2012/029548
PCT Pub. Date: Mar. 8, 2012

(65) Prior Publication Data
US 2013/0147839 A1   Jun. 13, 2013

(30) Foreign Application Priority Data

Aug. 31, 2010  (JP) ................................. 2010-194263
Aug. 9, 2011   (JP) ................................. 2011-174373

(51) Int. Cl.
*G09G 5/00*       (2006.01)
*G06T 19/00*      (2011.01)

(52) U.S. Cl.
CPC .................................... *G06T 19/006* (2013.01)
USPC ............................ 345/633; 345/632; 345/634

(58) Field of Classification Search
CPC ...... G06T 15/005; G06T 11/40; G09G 5/395; G09G 2340/125; B82Y 10/00
USPC .......................................... 345/633, 634, 632
See application file for complete search history.

(56) References Cited

U.S. PATENT DOCUMENTS 7,356,495 B2 *   4/2008  Beigl et al. ...................... 705/28
2008/0077510 A1 * 3/2008  Dielemans ...................... 705/28
(Continued)

FOREIGN PATENT DOCUMENTS

JP      10-228565 A    8/1998
JP       2962259 B2    8/1998
(Continued)

OTHER PUBLICATIONS

Danny Crasto, Amit Kale and Christopher Jaynes; "The Smart Bookshelf: A study of camera projector scene augmentation of an everyday environment"; Jan. 2005; Proceedings of the Seventh IEEE Workshop on Applications of Computer Vision; 1-8.*

(Continued)

*Primary Examiner* — Daniel Hajnik
*Assistant Examiner* — Naveed Hasan
(74) *Attorney, Agent, or Firm* — Arent Fox LLP

(57) ABSTRACT

An Augmented Reality (AR) providing apparatus sends to a server apparatus a request, including image information from an imaging device, for obtaining product information indicating a product that can be displayed on a shelf, and the AR apparatus displays product information included in a reply from the server apparatus in response to the request in an overlaying image manner. The server apparatus determines a shelf from the image information included in the request, determines a size of an empty shelf space, and selects product information of products smaller than the determined size of the empty shelf space. The product information is selected from a storage device storing multiple sets of product information indicating a product and its associated size information. The server apparatus sends a reply including the selected product information to the AR providing apparatus.

19 Claims, 16 Drawing Sheets

(56) References Cited

U.S. PATENT DOCUMENTS

| | | | |
|---|---|---|---|
| 2008/0147475 A1* | 6/2008 | Gruttadauria | 705/10 |
| 2009/0121017 A1 | 5/2009 | Cato et al. | |
| 2009/0285483 A1 | 11/2009 | Guven et al. | |
| 2010/0030578 A1* | 2/2010 | Siddique et al. | 705/3 |
| 2010/0149347 A1 | 6/2010 | Kim et al. | |
| 2010/0185529 A1 | 7/2010 | Chesnut et al. | |
| 2010/0287511 A1 | 11/2010 | Meier et al. | |

FOREIGN PATENT DOCUMENTS

| | | |
|---|---|---|
| JP | 2002-163436 A | 6/2002 |
| JP | 2002-366621 A | 12/2002 |
| JP | 2004-10201 A | 1/2004 |
| JP | 2005-216005 A | 8/2005 |
| JP | 2009-277224 A | 11/2009 |
| JP | 2010-541053 A | 12/2010 |
| WO | WO 2008/072191 A1 | 6/2008 |

OTHER PUBLICATIONS

International Search Report dated Sep. 20, 2011 issued in International Application No.: PCT/JP2011/068657.
Chinese Office Action issued in Application No. CN2011-80003821.5, dated May 24, 2013, 8 pages.
Extended European Search Report, European Patent Application No. 11821565.6 dated Oct. 9, 2014.

* cited by examiner

F I G. 1
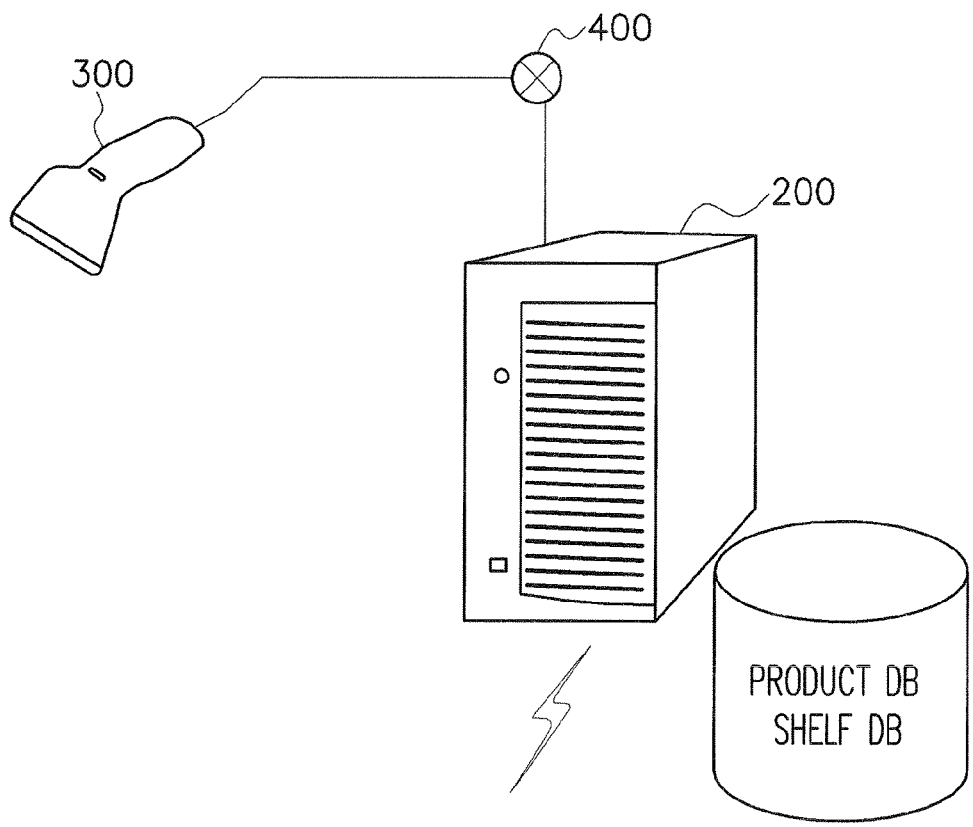
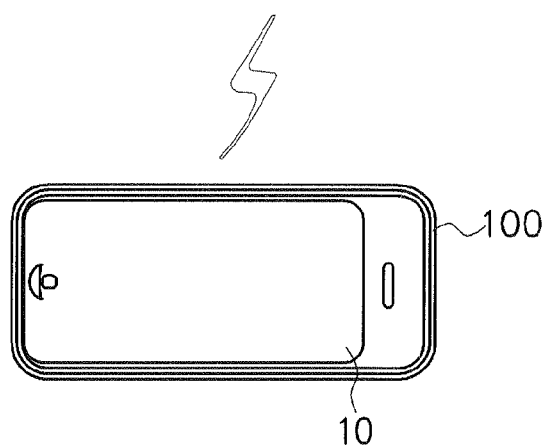

FIG. 4A

MASTER INFORMATION

| ITEM | REQUIRED |
|---|---|
| PRODUCT CODE | ◎ |
| PRODUCT CATEGORY | ◎ |
| PRODUCT NAME | ◎ |
| BRAND | ◎ |
| PRODUCT SIZE (HEIGHT/WIDTH/DEPTH) | ◎ |
| PRODUCT IMAGE (FRONT/SIDE/BOTTOM/TOP) | ◎ |
| SELLING PRICE | |
| COST PRICE | |
| SCHEDULED SALE START DATE/SCHEDULED SALE END DATE | |

FIG. 4B

TRANSACTION INFORMATION

| ITEM | REQUIRED |
|---|---|
| PRODUCT CODE | ◎ |
| STOCK QUANTITY | ◎ |
| WEEKLY UNIT SALES RECORD | ◎ |
| STOCK DAYS (OR STOCK TURNOVER NUMBER) | ◎ |
| SCHEDULED DELIVERY DATE, SCHEDULED DELIVERY QUANTITY | |

FIG. 4C

SHELF(FIXTURE) MASTER INFORMATION

| ITEM | REQUIRED |
|---|---|
| SHELF ID | ◎ |
| SHELF TYPE | ◎ |
| SHELF SPECIFICATIONS (WIDTH/HEIGHT/DEPTH/NUMBER OF LEVELS/LEVEL HEIGHT) | ◎ |

FIG. 4D

SHELVING ALLOCATION PATTERN MASTER INFORMATION

| ITEM | REQUIRED |
|---|---|
| PRODUCT CATEGORY | ◎ |
| NUMBER OF SHELVES, RESPECTIVE SHELF ID | ◎ |
| SPECIFIED PRODUCT, DISPLAY QUANTITY OF EVERY SHELF ADDRESS (LEVEL/COLUMN) | ◎ |
| SPECIFIED BRAND, DISPLAY QUANTITY OF EVERY SHELF ADDRESS (LEVEL/COLUMN) | ◎ |
| SCHEDULED DISPLAY START DATE/SCHEDULED DISPLAY END DATE | |
| DISPLAY METHOD FOR EVERY SHELF ADDRESS (LEVEL/COLUMN) AND EVERY SPECIFIED PRODUCT | |

FIG. 5A

MASTER INFORMATION

| PRODUCT CODE | PRODUCT CATEGORY | PRODUCT NAME | BRAND | PRODUCT SIZE | PRODUCT IMAGE | SELLING PRICE | COST PRICE | SCHEDULED SALE END DATE |
|---|---|---|---|---|---|---|---|---|
| 0123 | FOOD PRODUCT | PRODUCT S | BRAND A | 10,15,10 | http://··· | 1,000 | 800 | 2010/7/1 |
| 0124 | FOOD PRODUCT | PRODUCT Y | BRAND A | 10,15,10 | http://··· | 1,200 | 900 | 2010/7/1 |
| 0234 | MEDICAL PRODUCT | PRODUCT U | BRAND C | 10,10,10 | http://··· | 5,000 | 3,000 | 2010/7/1 |
| : | : | : | : | : | : | : | : | : |

FIG. 5B

TRANSACTION INFORMATION

| PRODUCT CODE | STOCK QUANTITY | WEEKLY UNIT SALES RECORD | STOCK DAYS | SCHEDULED DELIVERY QUANTITY | SCHEDULED DELIVERY DATE |
|---|---|---|---|---|---|
| 0123 | 200 | 35 | 40 | 100 | 2010/7/20 |
| 0124 | 150 | 70 | 15 | 20 | 2010/7/2 |
| 0234 | 100 | 14 | 50 | 100 | 2010/9/20 |
| : | : | : | : | : | : |

FIG. 5C

SHELF (FIXTURE) MASTER INFORMATION

| SHELF ID | SHELF TYPE | SHELF SPECIFICATIONS |
|---|---|---|
| 0001 | T001 | 200,200,100,3,60 |
| 0002 | T002 | 200,180,100,3,50 |
| 0003 | T003 | 200,180,150,3,50 |
| : | : | : |

FIG. 5D

SHELVING ALLOCATION PATTERN MASTER INFORMATION

| PRODUCT CATEGORY | SHELF ID | SHELF ADDRESS (LEVEL/COLUMN) | SPECIFIED PRODUCT | SPECIFIED BRAND | SCHEDULED DISPLAY END DATE | DISPLAY METHOD |
|---|---|---|---|---|---|---|
| FOOD PRODUCT | 0001 | FARST LEVEL | 0123,5 | - | - | STACK IN PYRAMID FORM |
| FOOD PRODUCT | 0001 | SECOND LEVEL | - | BRAND A | - | - |
| FOOD PRODUCT | 0001 | THIRD LEVEL | - | BRAND A | - | - |
| MEDICAL PRODUCT | 002,0003 | FARST LEVEL | 0234,5 | - | - | PLACE PACKAGES OBLIQUELY WHEN SEEN IN FRONT |
| : | : | : | : | : | : | : |

F I G. 7
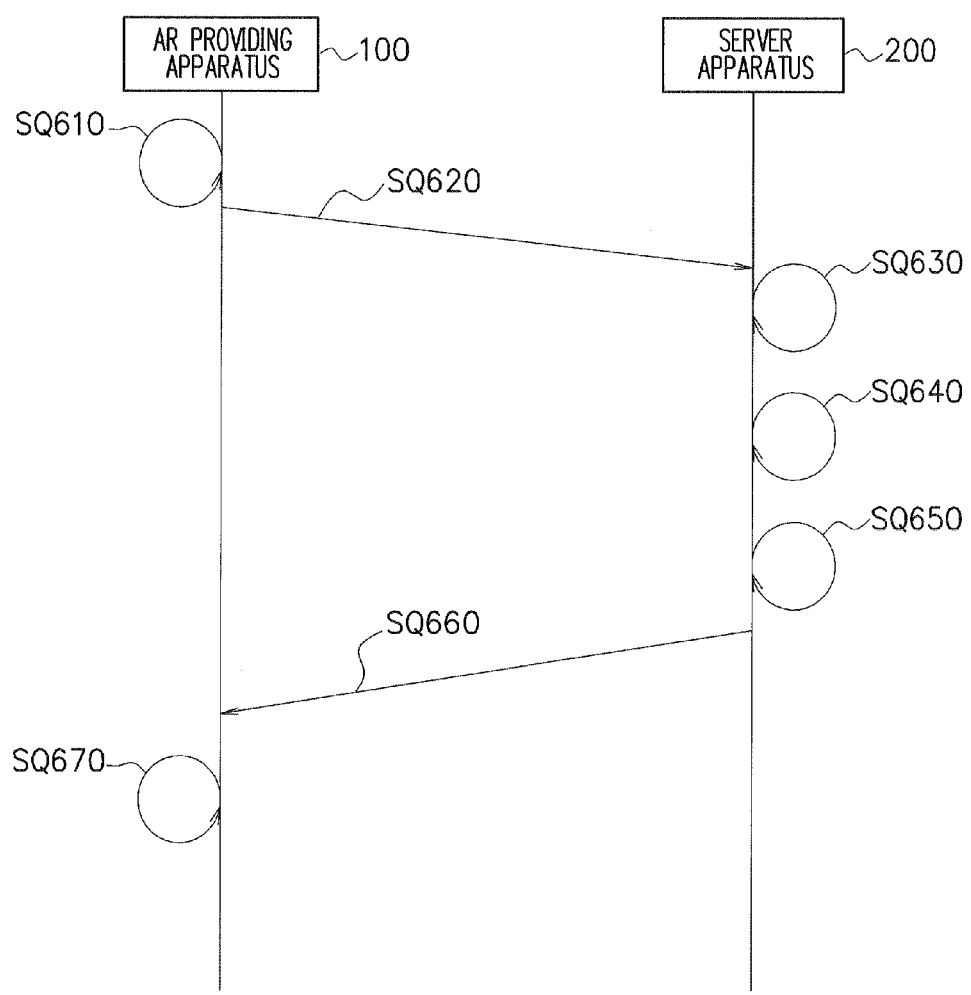

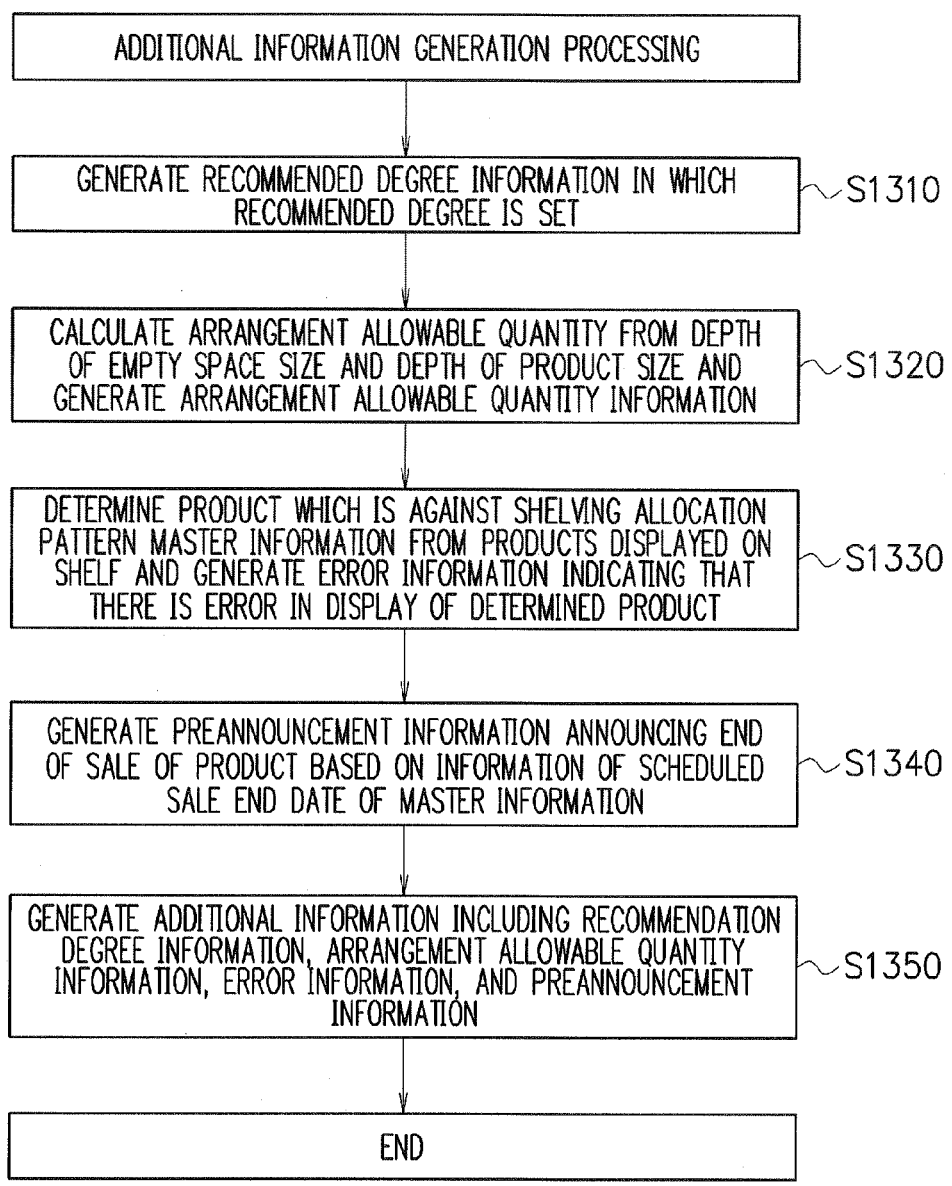
F I G. 17

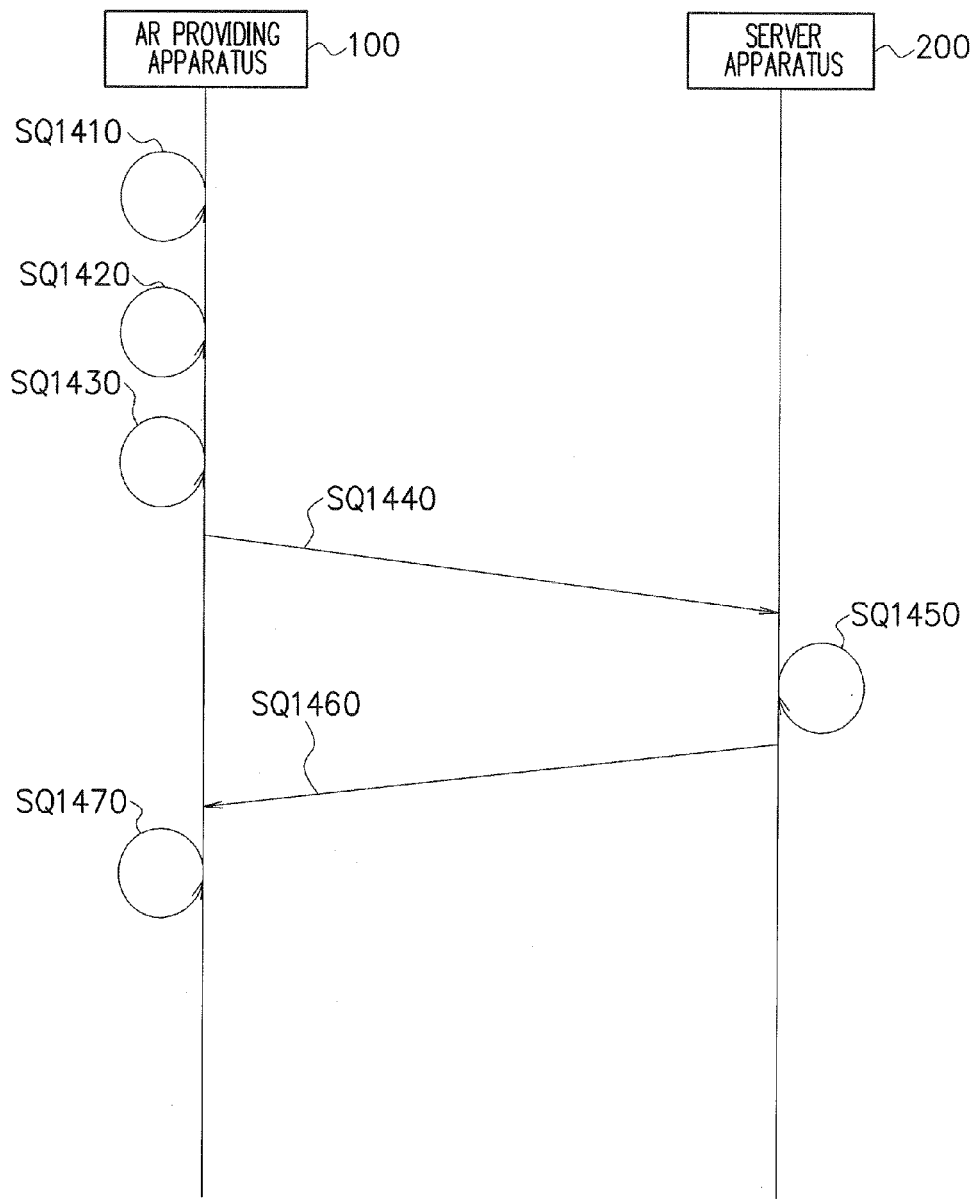

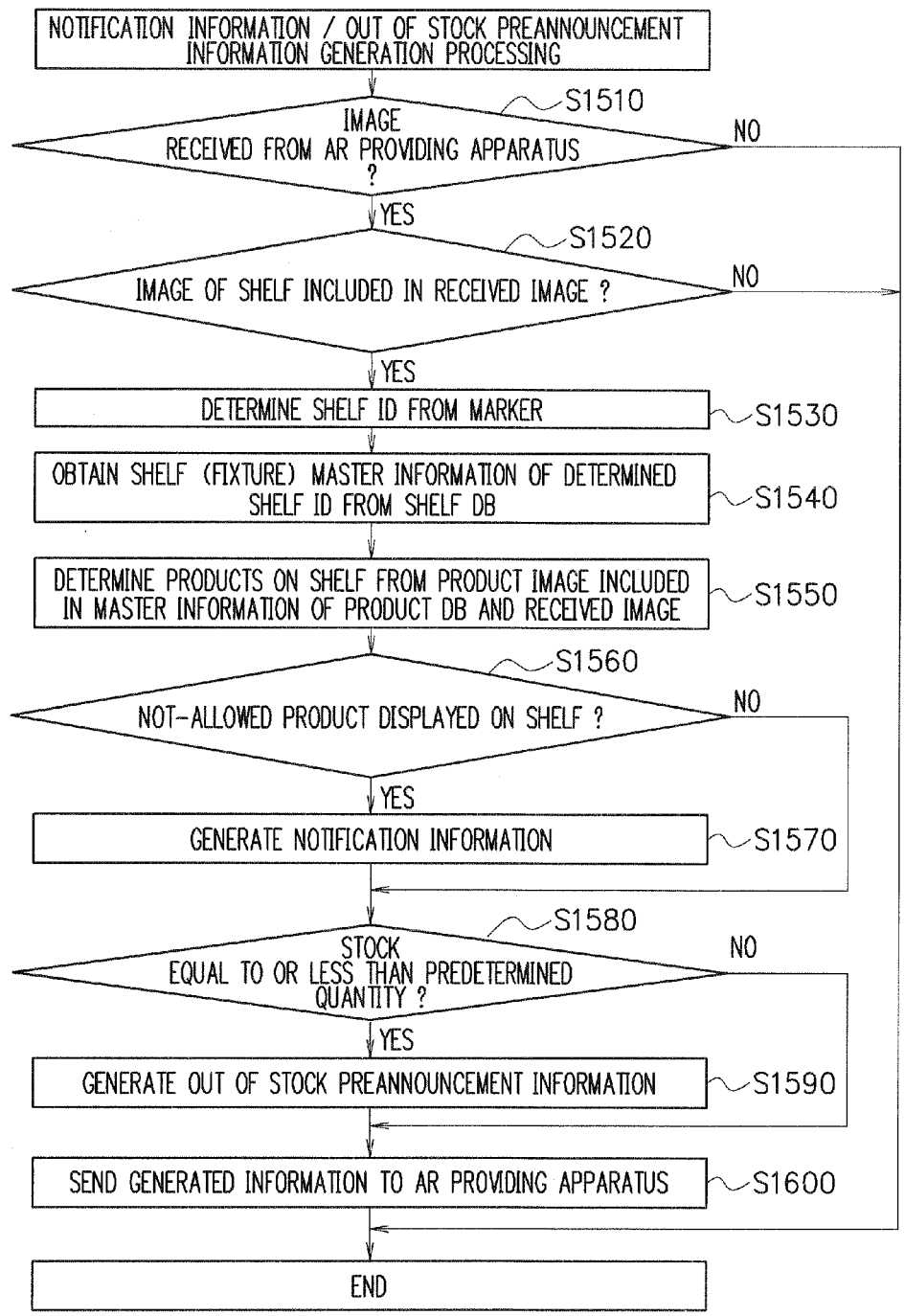

AUGMENTED REALITY PROVIDING SYSTEM, INFORMATION PROCESSING TERMINAL, INFORMATION PROCESSING APPARATUS, AUGMENTED REALITY PROVIDING METHOD, INFORMATION PROCESSING METHOD, AND PROGRAM

TECHNICAL FIELD

The present invention relates to an augmented reality providing system providing augmented reality, an information processing terminal, an information processing apparatus, an augmented reality providing method, an information processing method, and a program.

BACKGROUND ART

In a shop selling products, a manual describing where and how products should be disposed is created, and a clerk arranges products in accordance with the manual. Further, recently, a system to automatically create such a manual is introduced.

For example, there has been disclosed a technique to determine shelving allocation based on information of a shelf size, priority of each product such as seasonality, viewability of a shelf from a customer's viewpoint, and so on (Patent Literature 1).

Further, for example, there has been disclosed a technique to combine an image of a product on an image obtained by imaging the inside of a shop and visually display an appearance of shelving allocation (Patent Literature 2).

CITATION LIST

Patent Literature

Patent Literature 1: Japanese Patent No. 2962259
Patent Literature 2: Japanese Laid-open Patent Publication No. 2002-163436

SUMMARY OF INVENTION

Technical Problem

Here, when a product is sold out, the space where this product is displayed becomes an empty space. However, through the techniques described in Patent Literature 1 and Patent Literature 2, the clerk cannot determine other products which can be displayed in the generated empty space, and a problem arises that the empty space of the shelf is wasted.

The present invention is made in view of such a problem, and an object thereof is to more effectively use an empty space of a shelf.

Solution to Problem

Accordingly, an augmented reality providing system according to the present invention is an augmented reality providing system including an information processing terminal having an imaging unit and a display unit and an information processing apparatus which are communicable with each other, in which the information processing terminal has: a request unit sending to the information processing apparatus a request, including image information of contents of imaging in the imaging unit, for obtaining product information indicating a product which can be displayed on a shelf which can be determined from the image information; and a display control unit displaying product information, included in a reply sent from the information processing apparatus in response to the request, on the display unit in a manner of overlaying on image information imaged by the imaging unit, and the information processing apparatus has: a determination unit determining a shelf from the image information included in the request and determining a size of an empty space of the shelf; a selection unit selecting product information of products smaller than the size of the empty space of the shelf determined by the determination unit, from a storage unit storing plural sets of product information indicating a product and size information indicating a size of the product in association with each other; and a reply unit sending to the information processing terminal a reply including product information selected in the selection unit.

Here, the "request unit" corresponds to, for example, a request unit 150 which will be described later. The "display control unit" corresponds to, for example, a display control unit 155 which will be described later. The "determination unit" corresponds to, for example, a determination unit 250 which will be described later. The "selection unit" corresponds to, for example, a selection unit 255 which will be described later. The "reply unit" corresponds to, for example, a reply unit 265 which will be described later.

Further, an augmented reality providing method according to the present invention is an augmented reality providing method in an augmented reality providing system including an information processing terminal having an imaging unit and a display unit and an information processing apparatus which are communicable with each other, the method having: a requesting step of sending by the information processing terminal a request including image information of contents of imaging in the imaging unit to the information processing apparatus; a determining step of determining by the information processing apparatus a shelf from the image information included in the request and determining a size of an empty space of the shelf; a selecting step of selecting by the information processing apparatus product information of products smaller than the size of the empty space of the shelf determined in the determining step, from a storage unit storing plural sets of product information indicating a product and size information indicating a size of the product in association with each other; a replying step of sending by the information processing apparatus a reply including product information selected in the selecting step to the information processing terminal; and a display controlling step of displaying by the information processing terminal product information, included in a reply sent from the information processing apparatus in response to the request, on the display unit in a manner of overlaying on image information imaged by the imaging unit.

Advantageous Effects of Invention

According to the present invention, empty space of a shelf can be used more effectively.

BRIEF DESCRIPTION OF DRAWINGS

FIG. 1 is a diagram illustrating an example of the structure of an AR providing system.

FIG. 4A is a diagram illustrating an example of a data structure of a product DB.

FIG. 4B is a diagram illustrating an example of the data structure of the product DB.

FIG. 4C is a diagram illustrating an example of a data structure of a shelf DB.

FIG. 4D is a diagram illustrating an example of the data structure of the shelf DB.

FIG. 5A is a diagram illustrating an example of master information.

FIG. 5B is a diagram illustrating an example of transaction information.

FIG. 5C is a diagram illustrating an example of shelf (fixture) master information.

FIG. 5D is a diagram illustrating an example of shelving allocation pattern master information.

FIG. 7 is a diagram illustrating an example of a sequence of the AR providing system.

FIG. 17 is a diagram illustrating an example of a flowchart related to additional information generation processing.

FIG. 18 is a diagram illustrating an example of a sequence of the AR providing system.

FIG. 19 is a diagram illustrating an example of a flowchart related to notification information/out of stock preannouncement information generation processing.

DESCRIPTION OF EMBODIMENTS

Figure 2:
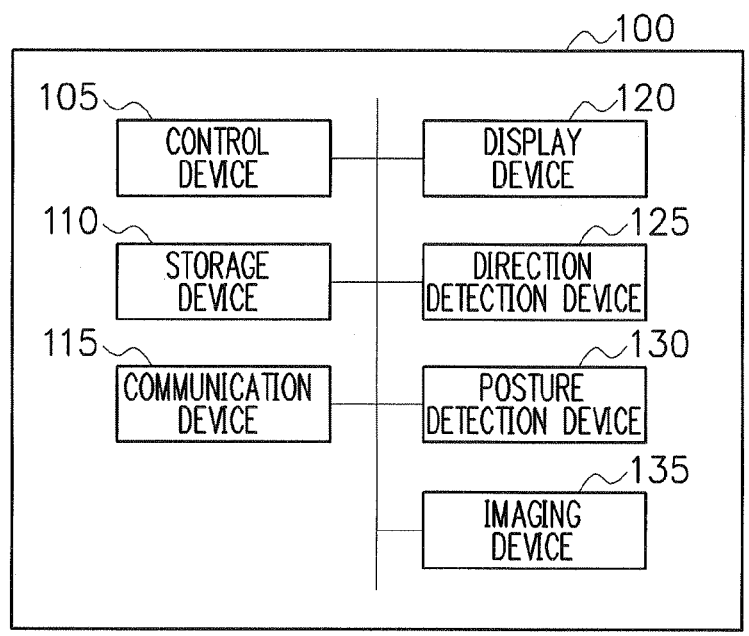
FIG. 2 is a diagram illustrating an example of a hardware structure of the AR providing apparatus.

Hereinafter, an embodiment of the present invention will be described with reference to the drawings.

FIG. 1 is a diagram illustrating an example of the structure of an AR providing system according to this embodiment. The AR providing system is an example of an augmented reality providing system which captures an empty space of a shelf in real time, selects a product recommended to be displayed on the shelf at the present moment out of products which match the size of the empty space (empty space size), and provides a user with information of the selected product. The AR providing system has an AR providing apparatus 100 and a server apparatus 200. The AR providing apparatus 100 and the server apparatus 200 are structured to be communicable with each other.

The AR providing apparatus 100 is an example of an information processing terminal (computer), and is a mobile information terminal, a mobile phone, an HMD (Head Mounted Display), a digital camera, or the like. The AR providing apparatus 100 provides an augmented reality (AR) by displaying an image (computer graphics image or the like) generated in the AR providing apparatus 100 at a position which matches a real space which can be perceived via the AR providing apparatus 100. In this embodiment, the AR providing apparatus 100 has a display screen 10 of touch panel type, and displays on the display screen 10 an image (augmented image) representing various information related to a product (product information which will be described later, and so on) at a position which matches a shelf on which products are displayed in a real space which can be perceived via the AR providing apparatus 100.

The server apparatus 200 is an example of an information processing apparatus (computer). The server apparatus 200 communicates with a POS (Point of sale system) terminal 300 via a network 400, and stores and manages various information related to sales of products (sales information) in a product DB. Further, the server apparatus 200 determines product information of a product recommended to be displayed in an empty space of a shelf based on a shelf DB storing various information related to shelves, the above-described product DB, and the like, and sends determined product information and the like to the AR providing apparatus 100.

Note that the structure of the AR providing system is not limited to the above-described structure. For example, although the structure in which the server apparatus 200 has the shelf DB and the product DB is employed, a structure may be employed in which an apparatus separated from the server apparatus 200 has the shelf DB and the product DB.

FIG. 2 is a diagram illustrating an example of a hardware structure of the AR providing apparatus 100. The AR providing apparatus 100 has a control device 105, a storage device 110, a communication device 115, a display device 120, a direction detection device 125, a posture detection device 130, and an imaging device 135.

The control device 105 is, for example, a CPU (Central Processing Unit), and reads as necessary a program from the storage device 110 and executes the program. By the program being executed, there are achieved functions in the AR providing apparatus 100 which will be described later and processing according to a flowchart which will be described later.

The storage device 110 is a ROM (Read Only Memory), a RAM (Random Access Memory), an HD (Hard Disk), and/or the like, and stores various information. Describing in more detail, the storage device 110 (ROM) stores a program and the like which are read first when the power of the AR providing apparatus 100 is turned on. Further, the storage device 110 (RAM) functions as a main memory of the AR providing apparatus 100. Further, the storage device 110 (HD) stores numeric data and the like calculated by the control device 105 other than the program. Note that the AR providing apparatus 100 may obtain various information to be stored in the storage device 110 from a recording medium such as a CD-ROM, or may download them via a network or the like.

The communication device 115 performs communication with an external apparatus (the server apparatus 200 or the like) to receive product information or the like. The product information or the like received in the communication device 115 is stored in the storage device 110.

The display device 120 is an example of a display unit, has a display screen 10 and displays various images on the display screen 10. Note that, in this embodiment, although a liquid crystal display of non-transmission type is described for example as the display device 120, a liquid crystal display of transmission type may be employed.

The direction detection device 125 is an electronic compass for example, detects weak geomagnetism (for example, geomagnetism in a forward and backward direction and geomagnetism in a leftward and rightward direction), and calculates the direction (direction information) of the AR providing apparatus 100 by calculating the direction of the north from the intensity of the geomagnetism.

The posture detection device 130 is a gyro sensor for example, detects the angular velocity of an object and calculates an angle (posture of the AR providing apparatus 100 (posture information)) by integrating the angular velocity, or the like.

The imaging device 135 is an example of an imaging unit and performs imaging of a real space.

Note that the hardware structure of the AR providing apparatus 100 is not limited to them. For example, a direction posture detection device having a function integrating the functions of the direction detection device 125 and the posture detection device 130 may be employed instead of the direction detection device 125 and the posture detection device 130. Further, for example, the AR providing apparatus 100 may not have the direction detection device 125 and the posture detection device 130.

Figure 3:
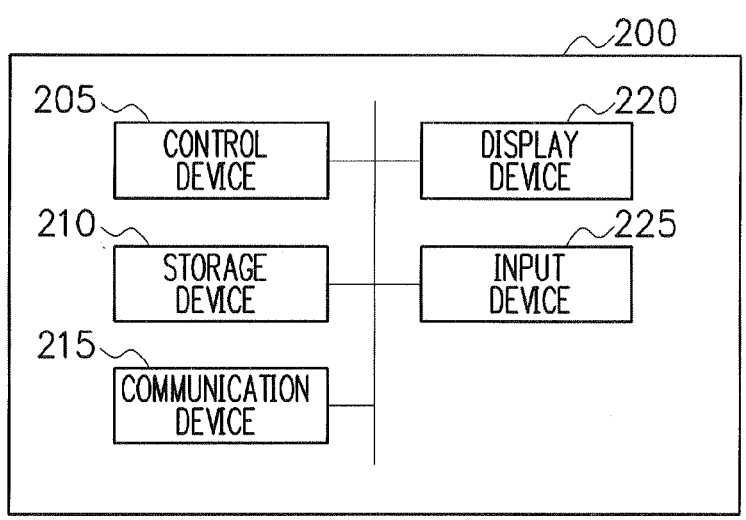
FIG. 3 is a diagram illustrating an example of a hardware structure of a server apparatus.

FIG. 3 is a diagram illustrating an example of a hardware structure of the server apparatus 200.

The server apparatus 200 has a control device 205, a storage device 210, a communication device 215, a display device 220, and an input device 225.

The control device 205 is, for example, a CPU (Central Processing Unit), and reads as necessary a program from the storage device 210 and executes the program. By the program being executed, there are achieved functions in the server apparatus 200 which will be described later and processing according to a flowchart which will be described later.

The storage device 210 is an example of a storage unit, is a ROM (Read Only Memory), a RAM (Random access memory), an HD (Hard Disk), and/or the like, and stores various information. In more detail, the storage device 210 (ROM) stores a program and the like which are read first when the power of the server apparatus 200 is turned on. Further, the storage device 210 (RAM) functions as a main memory of the server apparatus 200. Further, the storage device 210 (HD) stores numeric data and the like calculated by the control device 205 other than the program. Note that the server apparatus 200 may obtain various information to be stored in the storage device 210 from a recording medium such as a CD-ROM, or may download them via a network or the like.

The communication device 215 performs communication with an external apparatus (the POS terminal 300, the AR providing apparatus 100, or the like). For example, the communication device 215 receives an obtainment request for product information from the AR providing apparatus 100. Further, for example, the communication device 215 receives sales information from the POS terminal 300. The sales information received in the communication device 215 is stored in the storage device 210 (the product DB or the like).

The display device 220 is a display or the like and displays various information.

The input device 225 is a keyboard and/or a mouse operated by the user, by which various information is input to the server apparatus 200.

FIG. 4A to FIG. 4D are diagrams illustrating an example of a data structure of the product DB and the shelf DB. In the product DB, master information and transaction information are stored. In the shelf DB, shelf (fixture) master information and shelving allocation pattern master information are stored. FIG. 5A to FIG. 5D are diagrams illustrating an example of information (master information, transaction information, shelf (fixture) master information, and shelving allocation pattern master information) stored in the product DB and shelf DB. Specifically, an example of the master information is illustrated in FIG. 5A, an example of the transaction information is illustrated in FIG. 5B, an example of the shelf (fixture) master information is illustrated in FIG. 5C, and an example of the shelving allocation pattern master information is illustrated in FIG. 5D.

The master information is structured to include item information regarding product code, product category, product name, brand, product size, and product image, and multiple sets of the master information are stored in the product DB. In other words, each of the product category, product name, brand, product size, and product image is provided in association with a product code.

In the product code, information of a code which uniquely identifies a product is stored. In the product category, information of the category to which a product belongs (category information), for example, information such as "food article" or "medical product" is stored. In the product name, information of the name of a product is stored. In the brand, information (brand information) of the brand of a product (name of company, trademark, and/or the like) is stored. In the product size, information of height, width, depth of a product (size information indicating the size of a product) is stored.

In the product image, information of storage location of an image which three-dimensionally represents a product is stored. The image obtained by the information of storage location includes color images of the front face, side face, upper face, lower face of a product (product image information). More preferably, it is three-dimensional information of each product (for example, information used for generating a three-dimensional object), by which an image of a product viewed from an arbitrary direction can be drawn. Note that in the product image, binary data of an image may be stored instead of the information of storage location of an image. Further, the product image information may be of a monochrome image.

The master information may include item information regarding selling price, cost price, and scheduled sale start date (or scheduled sale end date). In the selling price, information of the selling price of a product is stored. In the cost price, information of the cost price of a product is stored. In the scheduled sale start date, information of scheduled timing (date) when the sale of a product starts (start information) is stored. In the scheduled sale end date, information of scheduled date when the sale of a product ends (end information) is stored.

The transaction information includes various information related to the sale of a product, and is updated appropriately based on sales information or the like received from the POS terminal 300. The transaction information is structured to include item information regarding product code, stock quantity, weekly unit sales record, and stock days (or stock turnover number). In the stock quantity, information of the quantity of products being stored in a warehouse or the like is stored. In the weekly unit sales record, information of the quantity of products sold in one week (record information indicating unit sales) is stored. Note that instead of or in addition to the weekly unit sales record, it is possible to employ items indicating a record of unit sales, such as daily unit sales record, monthly unit sales record, and yearly unit sales record. In the stock days, information of the number of days a product is held in stock is stored.

Here, the transaction information may include item information regarding scheduled delivery date and scheduled delivery quantity. In the scheduled delivery date, information of a scheduled date when a product is to be delivered is stored.

In the scheduled delivery quantity, information of the quantity of a product to be delivered on the scheduled delivery date is stored.

In this embodiment, it is assumed that the sales of products are performed in each of multiple shops, and information related to all the sales in the multiple shops is stored as the transaction information product by product in the product DB. However, this embodiment is not limited to this structure. For example, the transaction information may be stored shop by shop and product by product in the product DB. In this case, the transaction information is structured to include, for example, code item information (shop code) which uniquely identifies a shop.

The shelf (fixture) master information is structured to include item information regarding shelf ID, shelf type, and shelf specifications. In the shelf ID, code information which uniquely identifies a shelf is stored. In the shelf type, information representing the type of a shelf is stored. In the shelf specifications, information regarding the width, height, depth, number of levels, and level height of a shelf is stored.

The shelving allocation pattern master information is structured to include item information regarding product category, number of shelves (respective shelf ID), specified product and display quantity of every shelf address (level/column), and specified brand and display quantity of every shelf address (level/column). That is, the shelving allocation pattern master information is information (display rule information) regarding rules for identifying a product which is allowed (in other words, limited) to be displayed on the shelf.

Here, the shelving allocation pattern master information may include item information regarding scheduled spreading start date (or scheduled spreading end date), and display method for every shelf address (level/column) and specified product. In the scheduled spreading start date, there is stored information regarding the date when spreading of the pattern of shelving allocation is started when the product is a seasonal product or the like and the pattern of shelving allocation is changed every season. In the display method, information related to a display instruction of a product (display instruction information) is stored. For example, there is stored display instruction information such as stacking beer cases or the like in a pyramid form on a flat base, suspending stationery products or the like with hooks, or placing packages of shampoo refills obliquely when seen in front. These shelving allocation patterns are specified on a shop side or a supplier side and stored in advance as the shelving allocation pattern master information.

Note that although FIG. 4A to FIG. 4D illustrate required items in the master information, the transaction information, the shelf (fixture) master information, and the shelving allocation pattern master information, this embodiment may employ any other item as a required item instead of or in addition to these required items.

Figure 6:
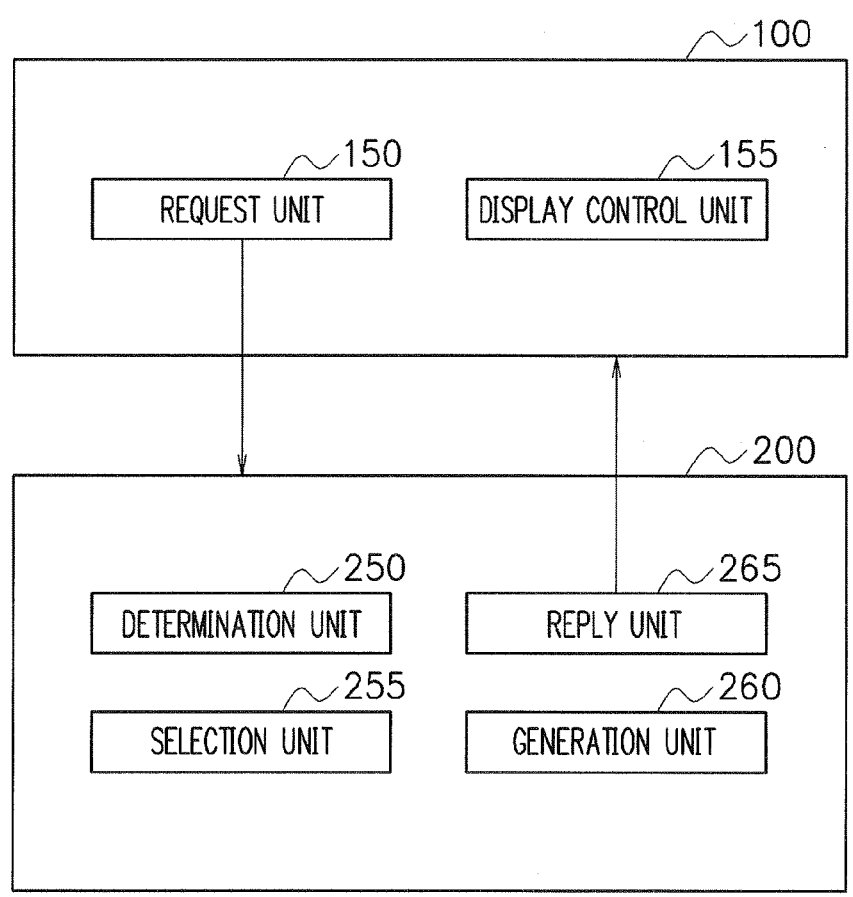
FIG. 6 is a diagram illustrating an example of functional structures of the AR providing apparatus and the server apparatus.

FIG. 6 is a diagram illustrating an example of functional structures of the AR providing apparatus 100 and the server apparatus 200.

The AR providing apparatus 100 has a request unit 150 and a display control unit 155. The server apparatus 200 has a determination unit 250, a selection unit 255, a generation unit 260, and a reply unit 265. In addition, the AR providing apparatus 100 has a control unit which centrally controls the request unit 150, display control unit 155, and so on. Further, the server apparatus 200 has a control unit which centrally controls the determination unit 250, the selection unit 255, the generation unit 260, the reply unit 265, and so on.

The request unit 150 sends to the server apparatus 200 a request for obtaining information (product information and the like) related to the product which is allowed to be displayed on a shelf which can be included in contents of imaging in the imaging device 135.

The display control unit 155 displays on the display screen 10, in a manner of overlaying on a shelf imaged in the imaging device 135, product information included in a reply sent from the server apparatus 200 in response to the request from the request unit 150.

The determination unit 250 determines an empty space size of a shelf from plural sets of shelf (fixture) master information stored in the shelf DB and an image (image information) included in the request by the request unit 150.

The selection unit 255 selects from the plural sets of the master information stored in the product DB the master information of a product (product information in a broad sense) which is smaller in size than the empty space size determined in the determination unit 250. Note that the selection unit 255 further selects the master information of a recommended product from the selected master information based on the transaction information of the product DB and the shelving allocation pattern master information of the shelf DB, details of which will be described later.

The generation unit 260 refers to the transaction information and so on of the product DB and generates information (additional information) related to display of products.

The reply unit 265 sends to the AR providing apparatus 100 a replay including product information generated based on the master information selected in the selection unit 255 and the additional information generated in the generation unit 260.

Figure 8:
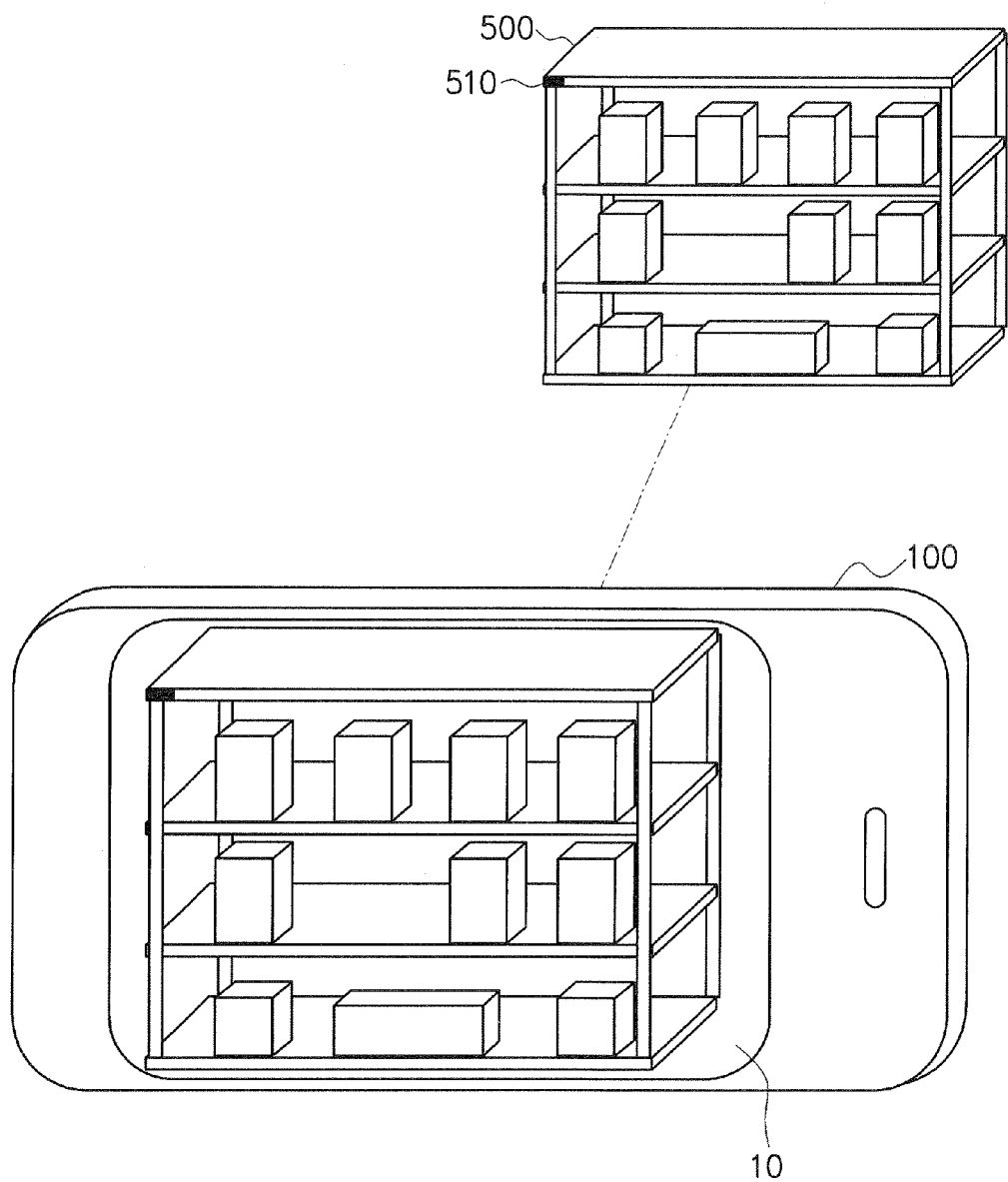
FIG. 8 is a diagram illustrating an example of display contents of a display screen.
Figure 9:
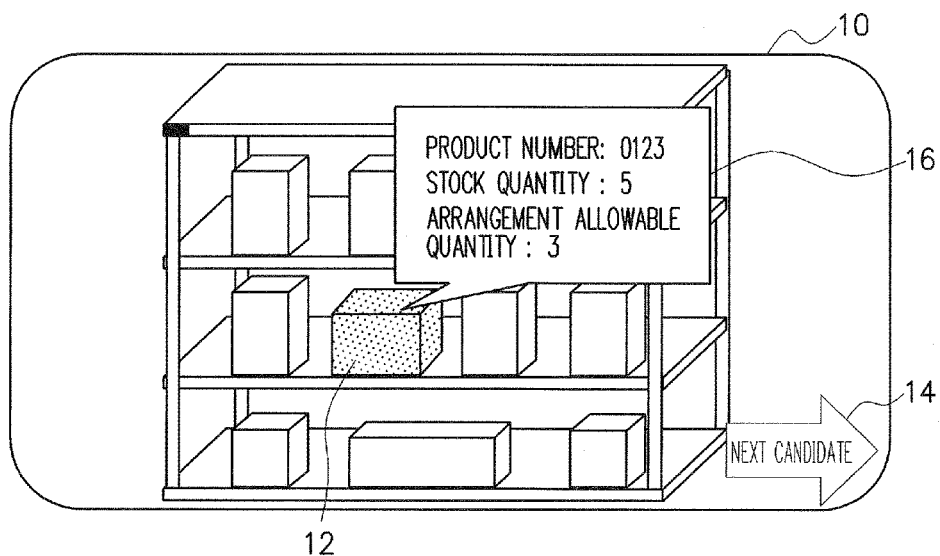
FIG. 9 is a diagram illustrating an example of display contents of the display screen.

FIG. 7 is a diagram illustrating an example of a sequence of the AR providing system. Here, FIG. 8 illustrates an example of display contents of the display screen 10 before processing of the sequence is performed (when the AR providing apparatus 100 is held up to a shelf 500). Further, FIG. 9 illustrates an example of display contents of the display screen 10 after processing of the sequence is performed.

In SQ610, the request unit 150 obtains an image at certain intervals from a video being imaged in the imaging device 135 (image obtainment).

In SQ620, the request unit 150 sends the obtained image to the server apparatus 200 at appropriate timing (image sending).

In SQ630, the determination unit 250 analyzes the received image and specifies a shelf based on the shelf (fixture) master information of the shelf DB (shelf determination). In this embodiment, as illustrated in FIG. 8 for example, a marker 510 by which the shelf 500 can be identified is added to the shelf 500. Thus, the determination unit 250 extracts information of the marker 510 by analyzing the received image, and obtains the shelf ID by which the shelf 500 can be identified from the information of the extracted marker 510. Note that in the marker 510, the shelf ID itself may be described, a two-dimensional barcode obtained by coding the shelf ID may be described, or a pattern to which the shelf ID is uniquely associated and/or an advertisement of the product may be described. Further, plural markers may be added to one shelf 500, and the shelf 500 may be identified using the plural markers. Then, the determination unit 250 obtains the shelf (fixture) master information (shelf specification and so on) from the shelf DB using the shelf ID as a key.

In SQ640, the determination unit 250 analyzes the received image and identifies the empty space size generated on the shelf 500 based on the shelf specifications obtained in SQ630 (empty space size determination). More specifically, the determination unit 250 analyzes the image and obtains the width of the empty space equal to or larger than a certain width (for example, 5 cm) generated on the shelf 500. At this time, the determination unit 250 analyzes the received image and determines what level and column the empty space is generated (the position of the empty space) on the shelf 500. In this example, the determination unit 250 determines that the empty space is generated on the second level. As a method for determining that this place is an empty space, various methods can be employed. For example, processing may be performed such that an image is imaged in advance when all products are arranged on the shelf 500, and a difference from the current image is taken to determine that it is the position of an empty space, or an empty space may be determined when the color and pattern of the shelf level are captured.

Then, the determination unit 250 decides the depth and level height of the determined empty space from the shelf specifications of the shelf 500, and thereby determines the empty space size having the decided depth and level height and the obtained width. For example, the actual dimensions of the empty space can be estimated from the ratio of the width of the empty space to the width of the shelf specified in the shelf specifications (when it is determined that the width of the empty space exists in about 15% of a shelf having a 1 m width, the actual width of the empty space is estimated as 15 cm). Note that the certain width may or may not be provided in advance in every shelf as an item of the shelf (fixture) master information.

In SQ650, the server apparatus 200 generates, via the selection unit 255 and the generation unit 260, the product information of a product which has a size which fits in the empty space size and is currently recommended to be arranged in the empty space (product information generation). The product information includes information of product code, information of product name, product image information, and so on. Note that the product information may include additional information such as information of stock quantity, arrangement allowable quantity information, error information, and the like.

In SQ660, the reply unit 265 sends to the AR providing apparatus 100 a reply, to the request from the request unit 150, including product information and position information, which is determined in the determination unit 250, of what level and column of the shelf 500 the empty space corresponds to (product information sending).

In SQ670, the display control unit 155 displays the received product information on the display screen 10 (image display). For example, the display control unit 155 displays, as illustrated in FIG. 9, product image information 12 of the product recommended to be displayed on the shelf 500 at the position matching the empty space of the shelf 500, and displays additional information 16 corresponding to the product image information 12 in a manner of pointing to the product image information 12. Further, the display control unit 155 displays a switching interface 14 for switching to the next candidate when it is determined that there are plural sets of product information recommended to be displayed on the shelf 500.

Here, as a method for aligning the position of the product image information 12 on the display screen 10, any overlaying display technique can be applied. In this embodiment, the method will be described taking an example of employing a common overlaying display technique of AR using a marker. Describing in more detail, the display control unit 155 determines the position of the empty space by using the position information of the empty space received from the reply unit 265 with reference to the image of the marker 510 imaged in the imaging device 135, and displays the product image information 12 at this position. Note that relative positions (directions) of the shelf 500 and the AR providing apparatus 100 can also be calculated by using the marker 510, and thereby the product image information 12 can be displayed as it is placed facing the front on the shelf 500.

Figure 11:
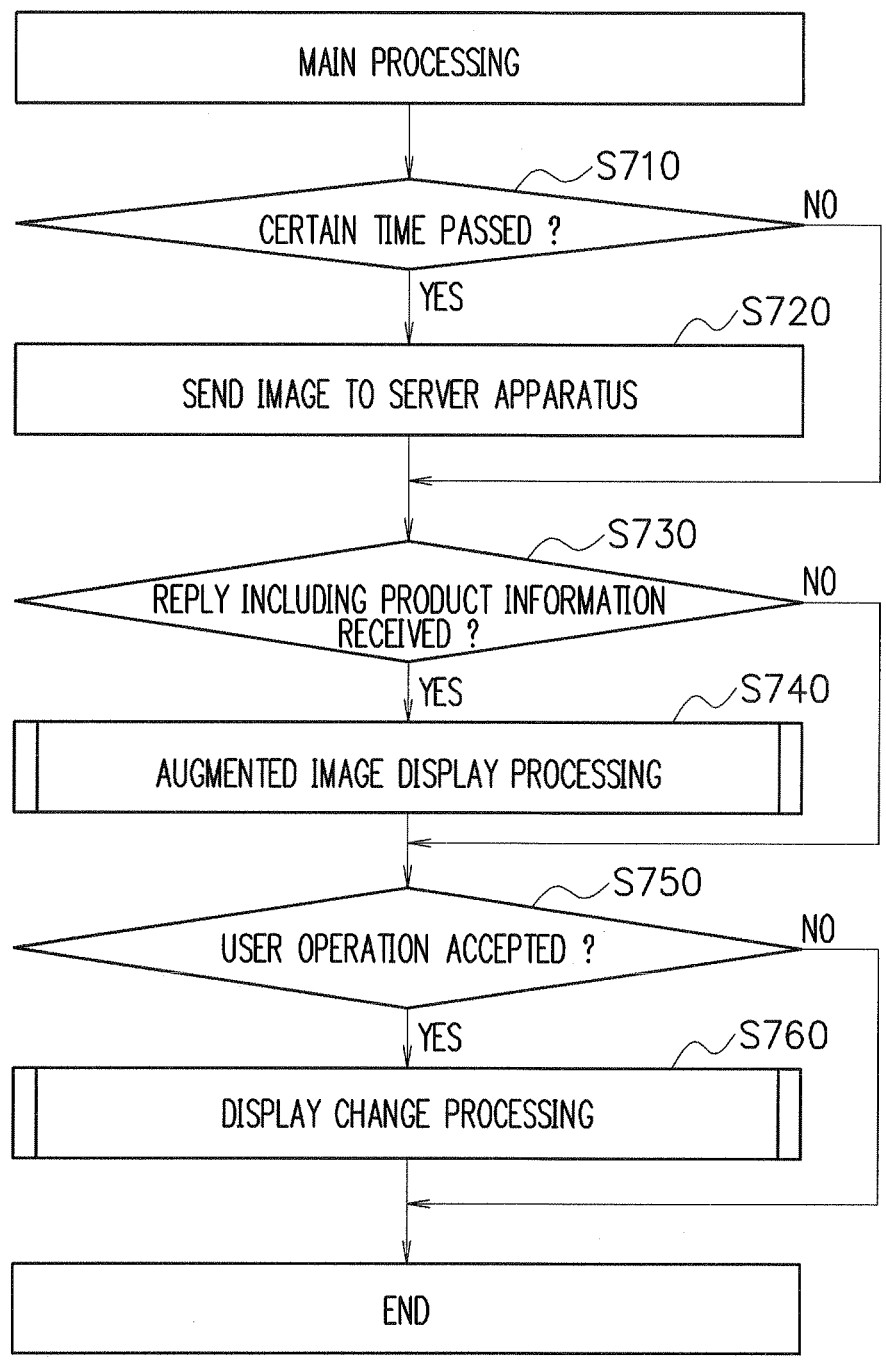
FIG. 11 is a diagram illustrating an example of a flowchart related to main processing of the AR providing apparatus.

FIG. 11 is a diagram illustrating an example of a flowchart related to main processing in the AR providing apparatus 100. Note that the main processing is assumed to be started periodically.

First, the control unit of the AR providing apparatus 100 determines whether or not a certain time has passed from previous transmission of an image to the server apparatus 200 (S710). When it is determined that the certain time has passed, S720 is performed, or when it is determined that the certain time has not passed, S730 is performed.

In S720, the request unit 150 obtains an image from the video imaged in the imaging device 135, and sends the obtained image to the server apparatus 200. Subsequently, S730 is performed.

In S730, the control unit determines whether the response including product information is received or not. When it is determined that the information is received, S740 is performed, or when it is determined that the information is not received, S750 is performed.

In S740, the display control unit 155 performs an augmented image display processing which will be described later. Subsequently, processing of S750 is performed.

In S750, the control unit determines whether an operation (user operation) of the display screen 10 of touch panel type, an input unit such as an input button, or the like provided in the AR providing apparatus 100 is accepted or not. When it is determined that the user operation is accepted, S760 is performed, or when it is determined that the user operation is not accepted, the main processing is finished.

In S760, the display control unit 155 performs display change processing which will be described later, and finishes the main processing.

Figure 12:
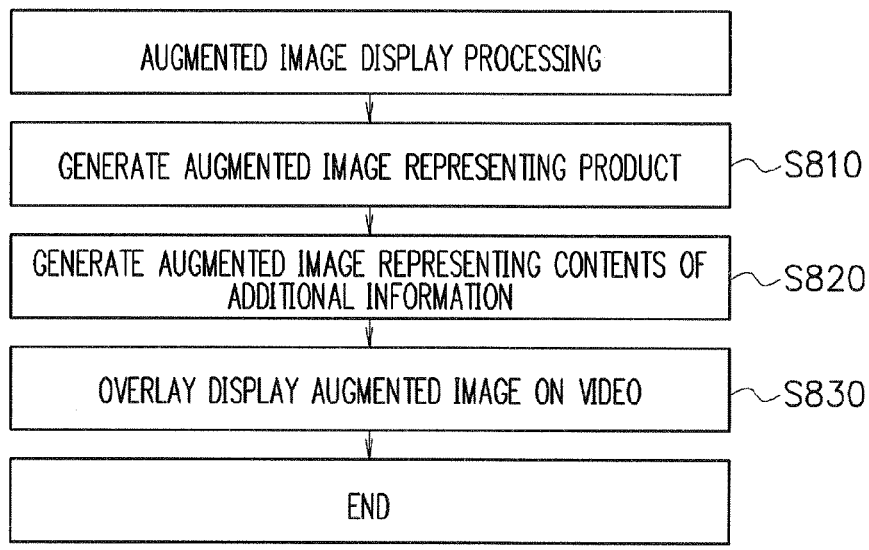
FIG. 12 is a diagram illustrating an example of a flowchart related to augmented image display processing.

FIG. 12 is a diagram illustrating an example of a flowchart related to augmented image display processing in the AR providing apparatus 100. The augmented image display processing is started upon reception of product information and upon acceptance of a user operation instructing a display of next candidate, which will be described later.

First, the display control unit 155 generates an augmented image based on the product information included in the received reply. As described above, the display control unit 155 displays the product image information 12 with reference to the image of the marker 510 and, when doing so, enlarges or reduces the first product image information (or product image information of the next candidate) included in the product information so as to correspond to the dimensions of the shelf displayed in the video imaged in the imaging device 135, thereby generating an augmented image representing a product with an adjusted size (S810).

Subsequently, the display control unit 155 generates an augmented image representing the contents of additional information corresponding to the augmented image representing the product (S820).

Subsequently, the display control unit 155 overlays the generated augmented image representing the product on the video imaged in the imaging device 135, displays the augmented image representing the contents of additional information at an appropriate position (S830), and finishes the augmented image display processing. Note that when multiple empty spaces exist in one image, the product image information 12 may be displayed on each of the empty images.

Figure 13:
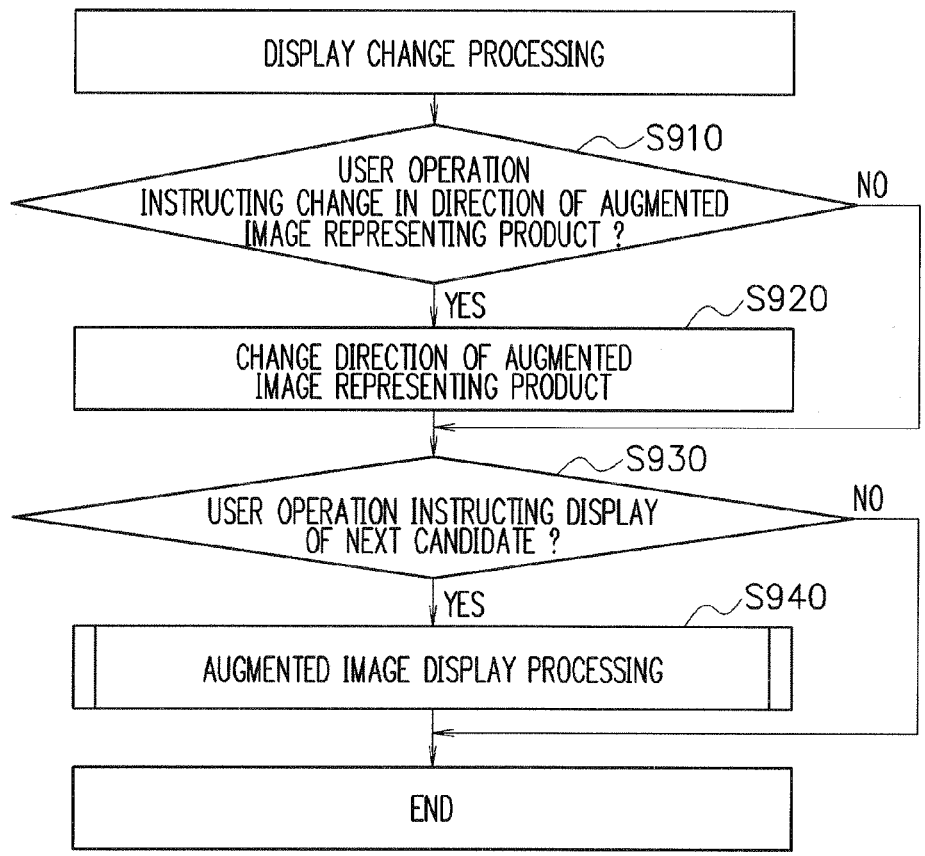
FIG. 13 is a diagram illustrating an example of a flowchart related to display change processing.

FIG. 13 is a diagram illustrating an example of a flowchart related to the display change processing in the AR providing apparatus 100.

First, the display control unit 155 determines whether a user operation on the touch panel that instructs a change in direction of the augmented image representing a product is accepted or not (S910). The display control unit 155 performs S920 when it is determined that the user operation is accepted, or performs the S930 when it is determined that the user operation is not accepted.

In S920, in response to the user operation, the display control unit 155 changes the direction of the augmented image representing a product. By thus changing the direction of the augmented image representing the virtually displayed product, it can serve as a reference when considering the appearance and color matching with other products.

In S930, the display control unit 155 determines whether a user operation (pressing down the switching interface 14, or the like) instructing to display the next candidate of the products allowed to be displayed on the shelf is accepted or not. The display control unit 155 performs S940 when it is determined that the user operation is accepted, or finishes the display change processing when it is determined that the user operation is not accepted.

In S940, the display control unit 155 performs the augmented image display processing and finishes the display change processing.

Figure 14:
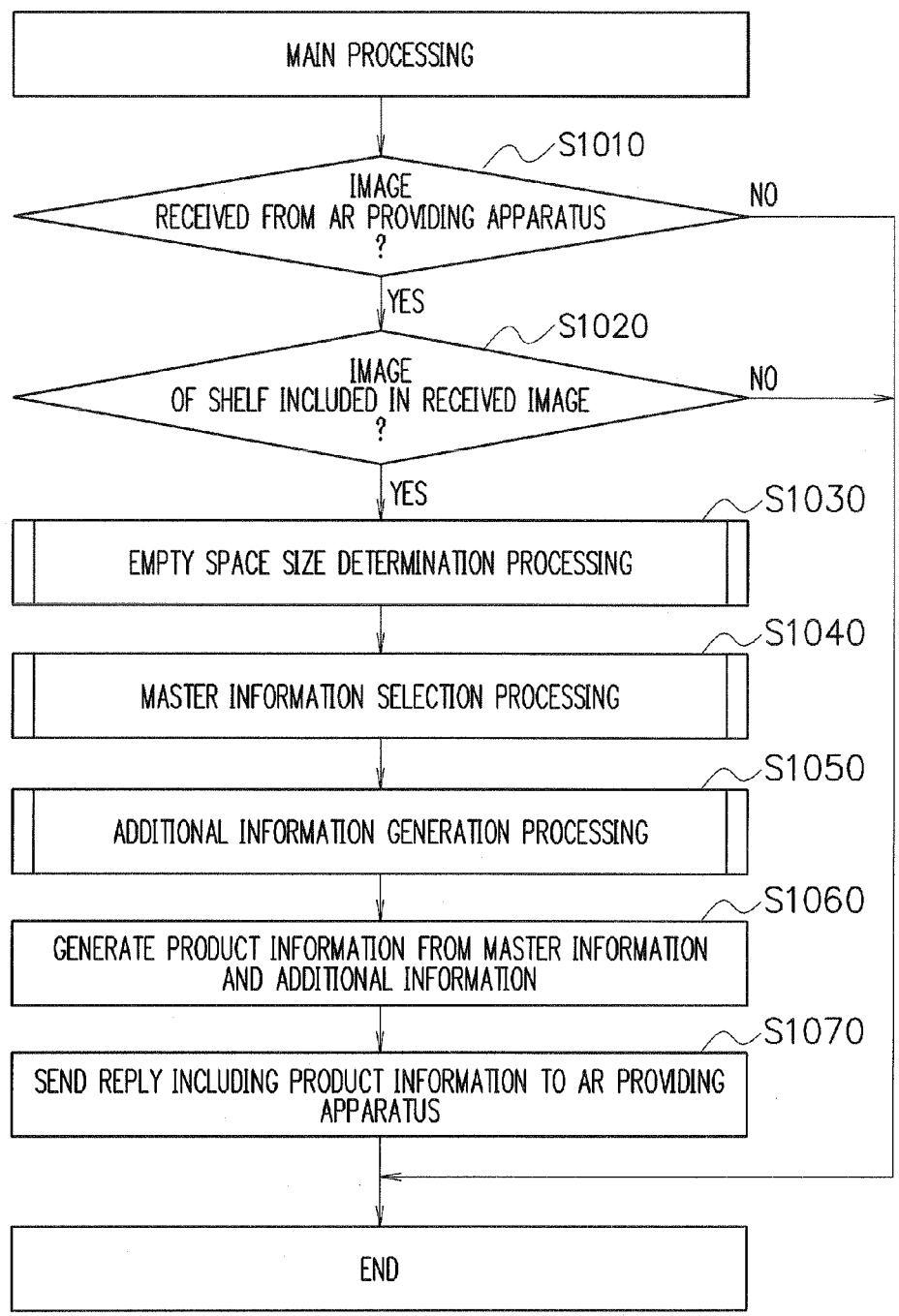
FIG. 14 is a diagram illustrating an example of a flowchart related to main processing of the server apparatus.

FIG. 14 is a diagram illustrating an example of a flowchart related to main processing in the server apparatus 200. Note that the main processing is assumed to be started periodically.

First, the control unit of the server apparatus 200 determines whether or not an image is received from the AR providing apparatus 100 (S1010). When it is determined that the image is received, S1020 is performed, and when it is determined that the image is not received, the main processing is finished.

In S1020, the control unit determines whether an image of a shelf is included in the received image or not. When it is determined that the image is included, S1030 to S1070 is performed, and when it is determined that the image is not included, the main processing finishes. Here, the control unit analyzes the received image, and determines that the image of a shelf is included when it is recognized that the information of a marker is included.

In S1030, the determination unit 250 performs empty space size determination which will be described later.

In S1040, the selection unit 255 performs master information selection which will be described later.

In S1050, the generation unit 260 performs additional information generation which will be described later.

In S1060, the generation unit 260 generates product information from master information selected in the master information selection and additional information generated in the additional information generation.

In S1070, the reply unit 265 sends a reply including the product information generated in the generation unit 260 to the AR providing apparatus 100.

Figure 15:
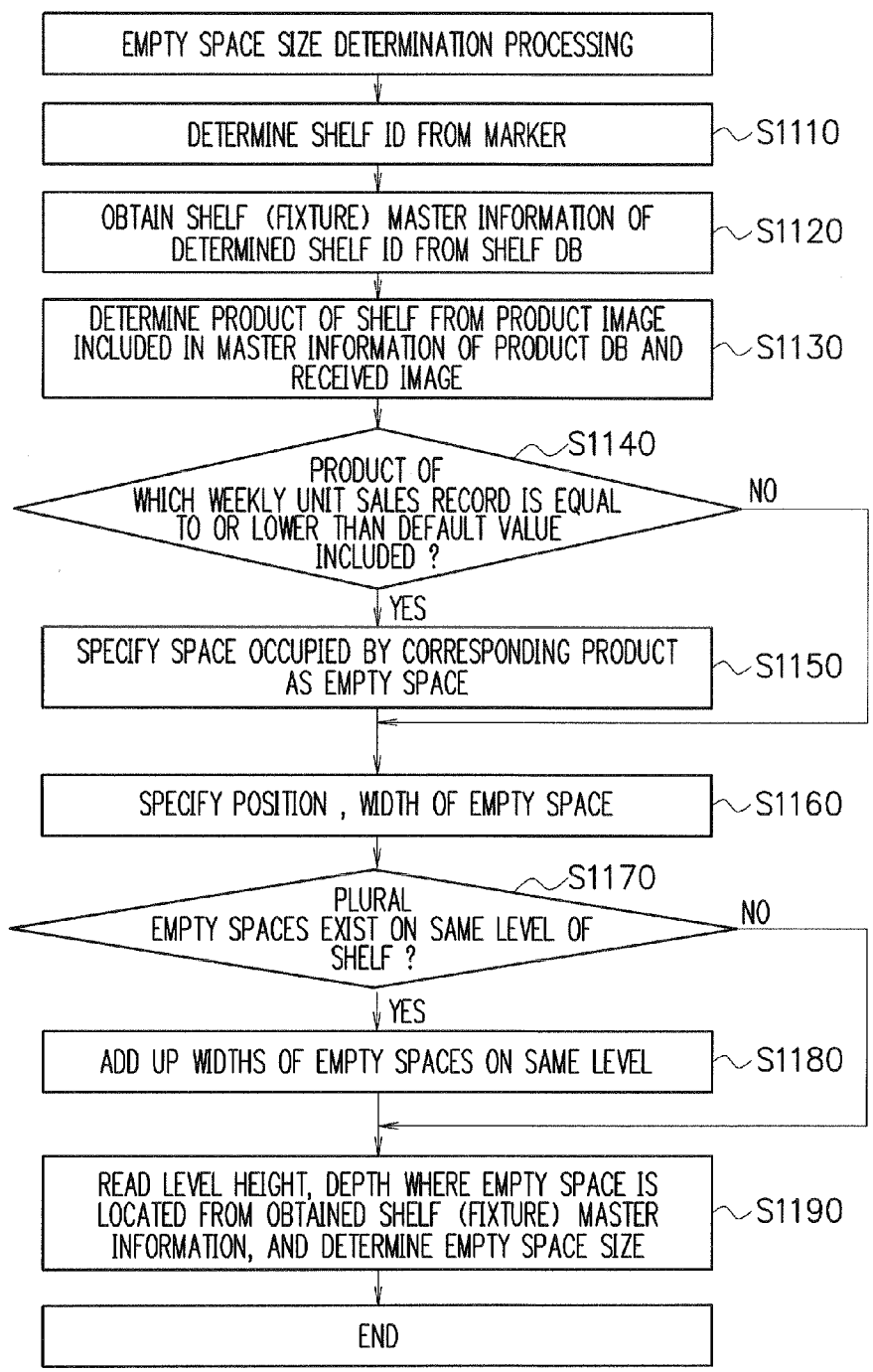
FIG. 15 is a diagram illustrating an example of a flowchart related to empty space size determination processing.

FIG. 15 is a diagram illustrating an example of a flowchart related to empty space size determination processing in the server apparatus 200.

First, the determination unit 250 determines the shelf ID from the information of a marker extracted by the control unit (S1110). In this embodiment, it is assumed that the shelf ID itself is described in the marker, and the determination unit 250 performs image processing to extract the marker added to a certain location of a shelf and obtain the shelf ID. Note that the method for determining a shelf is not limited to this structure. For example, the determination unit 250 may determine the shelf ID by determining plural products displayed on the shelf, that is, by using the plural products as the marker. In this structure, it is no longer necessary to add the marker to a certain location of the shelf. The description below will be given appropriately taking an example in which the shelf ID is determined as "0001".

Subsequently, the determination unit 250 obtains the shelf (fixture) master information from the shelf DB using the shelf ID as a key (S1120). That is, the determination unit 250 determines the shelf. Here, the determination unit 250 obtains shelf type "T001" and shelf specifications "200, 200, 100, 3, 60" as the shelf (fixture) master information.

Then, the determination unit 250 determines the products displayed on the shelf from information of product image included in the master information of the product DB and the received image information (S1130). For example, when it is determined that the information of product image is included in the received image information, the determination unit 250 obtains product codes from the master information which includes the information of product image.

Subsequently, the determination unit 250 refers to the product DB and determines whether or not a product of which information of weekly unit sales record is equal to or less than a default value (for example, one) is included in the products determined in S1130 (S1140). Here, the determination unit 250 obtains the product code of the product determined to be included, and determines the level and column (position) where this product is displayed on the shelf. At this time, the determination unit 250 performs S1150 when it is determined that the product is included, or performs S1160 when it is determined that the product is not included. Note that instead of this determination, it is also possible to determine whether or not a product of which information of stock days exceeded a default value (for example, 60 days) is included in the products determined in S1130, and perform S1150 when it is determined that the product is included, or perform S1160 when it is determined that the product is not included. Further, the determination unit 250 may perform the above-described two determinations together or may not perform either of the determinations (and S1150).

In S1150, the determination unit 250 specifies the space occupied by the corresponding product as an empty space. More specifically, the determination unit 250 obtains from the product DB the product size information of associated with the product code of the product which is determined to be included in S1140, and specifies as the empty space the size of the space constituted of the width of the obtained product size and the depth and level height of the shelf specifications obtained in S1120. Thus, by determining the product with relatively low unit sales and specifying the space occupied by the determined product as an empty space, the determination unit 250 becomes able to offer a product recommended to be arranged on the shelf at the present moment in place of the product with relatively low unit sales. That is, it functions to remove the product having relatively low unit sales from the shelf to create a space, and recommend a fast selling product for display there.

In S1160, the determination unit 250 determines the position and the width of the empty space obtained by analyzing the received image and the empty space specified in S1150. Here, it is assumed that the determination unit 250 analyzes the image and obtains one empty space having a width "20", and determines that this empty space is located on the second level of the shelf. Note that the size of the empty space is determined in SQ640 described above.

Subsequently, the determination unit 250 determines whether multiple empty spaces exist on the same level of the shelf based on the determined position of the empty space (S1170). The determination unit 250 performs S1180, when it is determined that multiple spaces exist, or performs S1190, when it is determined that they do not exist.

In S1180, the determination unit 250 adds up the widths of the empty spaces on the same level and then performs S1190.

In S1190, the determination unit 250 reads the level height and the depth where the empty space is located from the shelf (fixture) master information obtained in S1120, and takes the size of a space constituted of the width determined in S1160 (or the width added up in S1180) and the read level height and depth as the empty space size, and finishes the empty space size determination processing. Note that in the above-described example, the determination unit 250 determines an empty space size of width "20", height "60", and depth "100".

Figure 16:
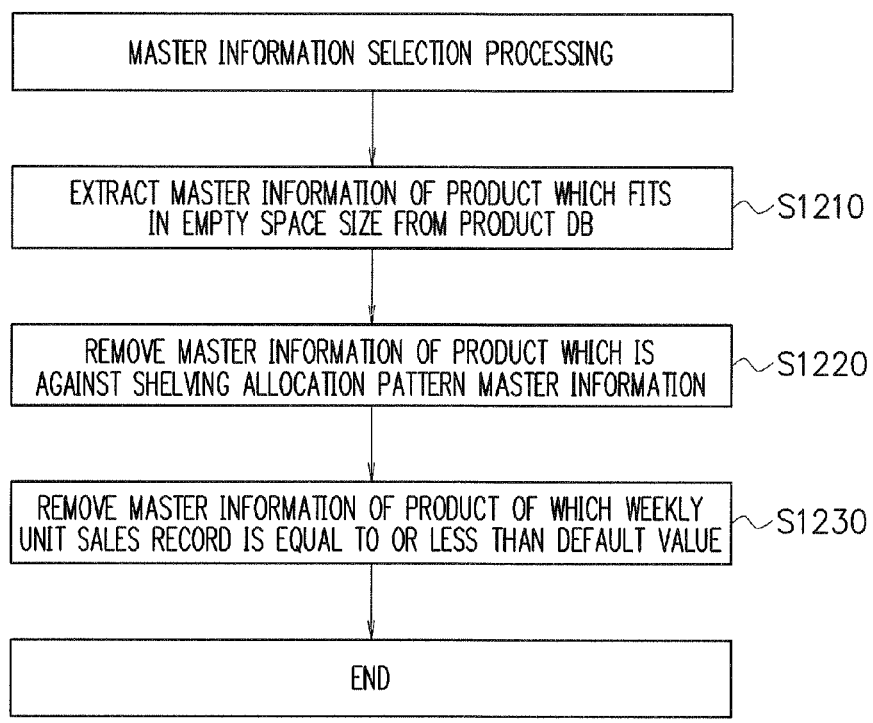
FIG. 16 is a diagram illustrating an example of a flowchart related to master information selection processing.

FIG. 16 is a diagram illustrating an example of a flowchart related to master information selection in the server apparatus 200.

First, for each empty space size determined in the determination unit 250, the selection unit 255 extracts the master information of a product which fits in the empty space size from the product DB (S1210). In the above-described example, since the empty space size is "20, 60, 100", the selection unit 255 extracts from the product DB the master information of product code "0123", product code "0124", and product code "0234" having a product size smaller than the empty space size.

Subsequently, the selection unit 255 determines whether or not each set of the extracted master information extracted for the empty space size is against the shelving allocation pattern master information, and removes any master information which is determined to be against (S1220). In the above-described example, since it is determined that the shelf ID is "0001" in S1110, first the selection unit 255 obtains three sets of the shelving allocation pattern master information from the top illustrated in FIG. 5D using the shelf ID "0001" as a key. Further, in the above-described example, since the empty space is located on the second level of the shelf, the selection unit 255 refers to the second set from the top of the shelving allocation pattern master information illustrated in FIG. 5D out of the obtained shelving allocation pattern master information, and selects the master information of the product code "0123" and the product code "0124" satisfying the conditions of product category "food product", specified product "-", specified brand "brand A". That is, the master information of the product code "0234" which is against the shelving allocation pattern master information is removed. Note that "-" represents that no product is specified. For example, when the specified product is "0123" and not "-", only a product with a product code which matches "0123" is allowed to be displayed on the shelf.

Subsequently, the selection unit 255 refers to the product DB and removes the master information of the product of which the information of weekly unit sales record is equal to or lower than a default value (S1230), and finishes the master information selection. In other words, the selection unit 255 preferentially selects the product information of a product of which the unit sales is relatively high. This structure allows a clerk to comprehend fast selling products. Further, when a structure to manage the unit sales of every shop is employed, the clerk can comprehend fast selling products peculiar to a region (neighboring shops) specified in advance.

FIG. 17 is a diagram illustrating an example of a flowchart related to additional information generation in the server apparatus 200.

First, the generation unit 260 generates recommendation degree information in which a recommendation degree is set to every master information selected in the master information selection (S1310). For example, the generation unit 260 refers to the product DB and sets a higher recommendation degree as the information of weekly unit sales record is higher. Further, for example, the generation unit 260 refers to the product DB and sets a higher recommendation degree as the information of stock turnover number is higher. Further, for example, the generation unit 260 refers to the product DB and sets a higher recommendation degree as the information of scheduled sale end date is closer to the present. Note that the generation unit 260 may set the recommendation degree by combining these settings. Here, when multiple sets of master information are selected in the master information selection processing and the recommendation degree information is generated, the display control unit 155 may display the recommendation degree information as it is, or may display product information in descending order of recommendation degrees based on the recommendation degree information.

Subsequently, from the depth of the empty space size and the depth of the product size of the product which can be displayed in this space, the generation unit 260 calculates the quantity of this products which can be displayed in a depth direction (arrangement allowable quantity) for every master information selected in the master information selection processing, and generates arrangement allowable quantity information (S1320). In the above-described example, since the empty space size is "width 20, height 60, depth 100" and regarding the product code "0123" the product size is "width 15, height 10, depth 10", the generation unit 260 calculates 60 (=1×6×10) as the arrangement allowable quantity information.

Subsequently, the generation unit 260 determines whether or not the products displayed on the shelf determined in the determination unit 250 in S1130 includes a product which is against the shelving allocation pattern master information. At this time, when it is determined that the product is included, the generation unit 260 determines the shelf ID in which the corresponding product is allowed to be displayed referring to the shelving allocation pattern master information of the shelf DB. Thereafter, the generation unit 260 generates error information (notification information) including the position of the corresponding product, the product code, information of the shelf ID, and information indicating that there exists a product which is not allowed to be displayed (S1330).

Subsequently, the generation unit 260 determines for every master information whether the information of scheduled sale end date included in the master information selected in the master information selection processing has reached a preset period or not. When it is determined that the date has reached, preannouncement information which preannounces the end of sale of the product is generated (S1340). For example, when the information of scheduled sale end date is "2010/7/1" and the preset period is one month, the generation unit 260 generates preannouncement information when it reaches "2010/6/1".

Subsequently, the generation unit 260 generates additional information including the recommendation degree information, the arrangement allowable number information, the error information, and the preannouncement information (S1350). Note that when it is determined that the information of display method is included in the shelving allocation pattern master information used in S1220, the generation unit 260 adds the information of display method to the additional information.

Note that the above-described processing can be employed in an appropriately combined manner.

As described above, the structure of this embodiment allows a recommendation of an appropriate product for an empty shelf space based on a consideration of the following factors:

a product which fits in the empty space size must be found, when an empty space is generated at multiple positions, a mixed empty space size is desired to be added, a display method and the like may be specified from the supplier depending on the product, and it is required that the product be selected and displayed in a state of complying with this specification, if an original out-of-stock product is delivered, it must be returned immediately, and so on.

Second Embodiment

In the first embodiment, a display in the AR providing apparatus of the information of a recommended alternative product for an empty shelf space is generated. In this embodiment, other information can be displayed related to the display of a product in the AR providing apparatus using the same hardware structure illustrated in the first embodiment, as will be described in detail.

More specifically, in this embodiment, a non-allowed product is displayed on the shelf. This may occur, e.g. because a clerk erred carelessly in display of products, or a customer placed a product taken from a shelf in a different shelf, and the like. This error in placement of a product is a problem liable to occur particularly when there is an empty space, and tends to become a hindrance to effective utilization of an empty space. Accordingly, this embodiment employs a structure to provide a clerk with information for correcting this error.

Note that in this embodiment, the same reference numerals are used for the same components as those in the first embodiment, and the descriptions thereof are omitted.

FIG. 19 is a flowchart corresponding to FIG. 14 and FIG. 15 of the first embodiment, and mainly describes processing different from the first embodiment. S1510 and S1520 are the same as S1010 and S1020. Further, S1530 to S1550 are the same as S1110 to S1130.

In S1560, the generation unit 260 determines whether or not a non-allowed product is displayed on the shelf. The method for determining is not particularly limited. For example, it may be a structure such that an image is imaged in advance when all products are arranged on the shelf 500, and a difference from the current image is taken to determine whether there is a different product or not. Further, for example, it may be a structure to make a determination by performing matching processing of images separately based on information stored in the product DB and the shelf DB regarding respective product images displayed on the shelf 500 imaged in the imaging device 135.

Figure 10:
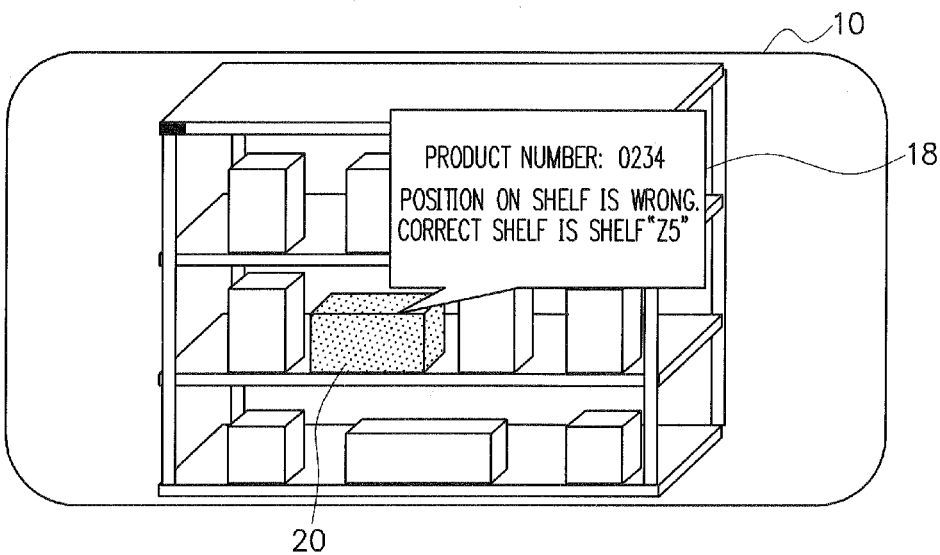
FIG. 10 is a diagram illustrating an example of display contents of the display screen.

When it is determined that it is not displayed (NO) in S1560, the generation unit 260 performs S1580. On the other hand, when it is determined that it is displayed (YES), the generation unit 260 performs S1570. FIG. 10 is a diagram illustrating an example in which notification information indicating that there exists a product not allowed to be displayed is displayed in the AR providing apparatus 100. In this example, in addition to that the shelf "Z5" which is the original position, there is presented information indicating that the arrangement of the product with a product number "0234" is wrong.

Thus, even in the case where it is difficult for a person to find an error in a one-by-one manner regarding display of products on a shelf, according to this embodiment, it can be easily determined. By presenting the original position of display, it is possible to reduce the operation load on a clerk.

Note that since it is possible that merely the direction of display of a product is wrong, it is preferred to use pictures taken from several directions or to use three-dimensional information, regarding the product image.

Subsequently, in S1580, regarding the products of the shelf currently imaged, the generation unit 260 extracts stock quantity information (not illustrated) indicating the quantity of stock of a product from the product DB, and determines whether the stock quantity is less than a predetermined quantity or not. This predetermined quantity may be determined for each product, or may be determined for each product category.

When it is determined that the stock quantity is not less than the predetermined quantity (NO), the generation unit 260 performs S1600. On the other hand, when it is determined that the stock quantity is less than the predetermined number (YES), the generation unit 260 generates out of stock preannouncement information in S1590.

The out of stock preannouncement information is information for notifying a clerk of a stock condition such as "this product is a bit short of floor stock", "this product is out of stock in the backyard", or the like, and is displayed in a manner of overlaying on the shelf in the AR providing apparatus 100 as described in the first embodiment.

Normally, it is possible to recognize the status of stock by referring to an apparatus such as POS or a paper stock sheet. However, according to this embodiment, information is displayed in a manner of overlaying on a shelf while standing in front of the shelf, and thus the clerk is able to comprehend the status of the stock in one glance without looking for the shelf.

As described above, according to this embodiment, not only an empty shelf space can be utilized, but also it is possible to instruct a clerk to correct an error when the clerk erred carelessly in displaying a product, when a customer placed a product taken from a shelf on a different shelf, and the like, thereby enabling to more effective use of the shelf.

Note that this embodiment can be employed independently or can be implemented, for example, in combination with the first embodiment.

Third Embodiment

In this embodiment, the AR providing apparatus 100 has the function of the determination unit 250, and the server apparatus 200 does not have the function of the determination unit 250. With reference to FIG. 18, differences from the first embodiment will be described below.

FIG. 18 is a diagram illustrating an example of a sequence of the AR providing system. SQ1410 is similar to SQ610, SQ1420 is similar to SQ630, SQ1430 is similar to SQ640, SQ1450 is similar to SQ650, SQ1460 is similar to SQ660, SQ1470 is similar to SQ670, and thus their descriptions are omitted.

In SQ1440, the request unit 150 sends an obtainment request for product information including determination information to the server apparatus 200 (determination information transmission). The determination information includes information of shelf ID determined in SQ1420, information of empty space size determined in SQ1430, and so on.

According to the structure of the above-described embodiments, an empty shelf space can be used more effectively.

In the foregoing, although the preferred embodiments of the present invention have been described in detail, the invention is not limited to such specific embodiments, and various changes and modifications are possible within the scope of the spirit of the present invention described in the claims.

For example, the AR providing apparatus 100 is described as an apparatus having the display screen 10 of touch panel type, but an apparatus of spectacle type such as HMD may be employed.

Further, for example, the product size is stored in the product DB as information basically aligned with a direction to be displayed, but it may be structured such that product sizes are stored assuming several directions of display even for the same product. That is, in S1210 of FIG. 12, when extracting a product which fits in the empty space size, the selection unit 255 performs the extraction according to the product size stored in the product DB, but in this structure, a product can be extracted even when the product is displayed in any of the directions.

Further, although in S1110 of FIG. 15, the determination unit 250 determines the shelf ID by using plural products as the marker, e.g., the shelf ID may also be identified using a product price tag posted on the shelf as the marker.

Further, for example, in the empty space size determination processing described in FIG. 15, it is not necessary to perform all the processing, but only a space which is actually empty may be determined as an empty space without performing the processing of S1130 to S1150.

Moreover, for example, FIG. 16 illustrates only one kind of product being offered for one empty space, but it may be structured to select products, when the empty space is large, so as to display multiple kinds of products side by side. In this case, the conditions are set so that the total value of the multiple product sizes becomes smaller than the empty space size, and the shelving allocation pattern master information is set in advance, as necessary.

Further, for example, each embodiment may be combined and used as necessary.

The present invention can be achieved by a computer executing a program. Further, a computer readable recording medium recording the aforementioned program and a computer program product of the aforementioned program or the like can be applied as an embodiment of the present invention. As the recording medium, a flexible disk, a hard disk, an optical disk, a CD-ROM, a magnetic tape, a non-volatile memory card, a ROM, or the like can be used.

It should be noted that the above embodiments merely illustrate concrete examples of implementing the present invention, and the technical scope of the present invention is not to be construed in a restrictive manner by these embodiments. That is, the present invention may be implemented in various forms without departing from the technical spirit or main features thereof.

INDUSTRIAL APPLICABILITY

According to the present invention, empty shelf space can be used more effectively.

The invention claimed is:

1. An augmented reality providing system comprising an information processing terminal having an imaging unit and a display unit and an information processing apparatus which are communicable with each other, wherein
the information processing terminal comprises:
a request unit sending to the information processing apparatus a request, including image information of contents of imaging in the imaging unit, for obtaining product information indicating a product which can be displayed on a shelf which can be determined from the image information; and
a display control unit displaying product information, included in a reply sent from the information processing apparatus in response to the request, on the display unit in a manner of overlaying on image information imaged by the imaging unit, and
the information processing apparatus comprises:
a determination unit determining a shelf from the image information included in the request and determining a size of an empty space of the shelf;
a selection unit selecting product information of products smaller than the size of the empty space of the shelf determined by the determination unit, from a storage unit storing a plurality of sets of product information indicating a product and size information indicating a size of the product in association with each other; and
a reply unit sending to the information processing terminal a reply including product information selected in the selection unit,
wherein the storage unit stores display rule information identifying a product allowed to be displayed on the shelf, and
wherein the selection unit selects product information of a product, from among multiple potential products smaller than the size of the empty space of the shelf, the selected product identified as being allowed to be displayed on the shelf from the display rule information.

2. The augmented reality providing system according to claim 1, wherein
the storage unit stores display rule information identifying a product allowed to be displayed on the shelf, and
the selection unit selects product information of a product identified as allowed to be displayed on the shelf from the display rule information out of the product information of products smaller than the size of the empty space of the shelf.

3. The augmented reality providing system according to claim 2, wherein
the display rule information includes category information of the product allowed to be displayed on the shelf, and
the selection unit selects product information of a product belonging to the category information out of the product information of products smaller than the size of the empty space of the shelf.

4. The augmented reality providing system according to claim 2, wherein
the display rule information includes brand information of the product allowed to be displayed on the shelf, and
the selection unit selects product information of a product of a brand corresponding to the brand information out of the product information of products smaller than the size of the empty space of the shelf.

5. The augmented reality providing system according to claim 2, wherein
the display rule information includes product information of the product allowed to be displayed on the shelf, and
the selection unit selects product information which matches the product information included in the display rule information out of the product information of products smaller than the size of the empty space of the shelf.

6. The augmented reality providing system according to claim 1, wherein
the storage unit stores information indicating unit sales records of every product, and the selection unit preferentially selects product information of a product of which the unit sales record is relatively high out of the product information of products smaller than the size of the empty space of the shelf.

7. The augmented reality providing system according to claim 1, wherein
the storage unit stores information indicating unit sales records of every product, and
the product information stored in the storage unit include product image information representing products, and
the determination unit identifies products displayed on the shelf from the image information included in the request and the product image information stored in the storage unit, determines a product of which the unit sales record is relatively low from the products displayed on the shelf, and determines a size of a space which is generated when the determined product is removed from the shelf as the size of the empty space of the shelf.

8. The augmented reality providing system according to claim 1, wherein
when it is determined that there are a plurality of empty spaces on a same level of the shelf from the image information included in the request, the determination unit determines a size obtained by adding up the plurality of empty spaces as the size of the empty space of the shelf.

9. The augmented reality providing system according to claim 1, wherein
the storage unit stores end information indicating when a sale ends for every product,
the information processing apparatus further comprises a creation unit creating, when it is determined based on the end information that there is product information of a product of which sale ends when a preset time passes in the product information selected in the selection unit, instruction information indicating an instruction related to the end of sale of the product,
the reply unit sends the instruction information to the information processing terminal when the instruction information is created in the creation unit, and
the display control unit displays the instruction information on the display unit.

10. The augmented reality providing system according to claim 1, wherein
the storage unit stores display rule information identifying a product allowed to be displayed on the shelf and product image information representing the product,
the information processing apparatus further comprises a creation unit creating, when it is identified that there is a product which is not allowed to be displayed on the shelf from the display rule information and from the image information included in the request and the product image information stored in the storage unit, indication information indicating an existence of the product which is not allowed to be displayed on the shelf,
the reply unit sends the indication information to the information processing terminal when the indication information is created in the creation unit, and
the display control unit displays the indication information on the display unit.

11. The augmented reality providing system according to claim 1, wherein the contents of imaging comprise an image of a product shelf, and wherein the product information comprises a product image overlaid on the image information at a position matching the empty space of the shelf.

12. An augmented reality information processing apparatus, comprising:
a determination unit determining a shelf from image information of contents of imaging in an imaging unit sent from an information processing terminal having the imaging unit and a display unit for displaying product information in a manner of overlaying on image information imaged by the imaging unit and determining a size of an empty space of the shelf;
a selection unit selecting product information of products smaller than the size of the empty space of the shelf determined by the determination unit, from a storage unit storing a plurality of sets of product information indicating a product and size information indicating a size of the product in association with each other; and
a reply unit sending to the information processing terminal a reply including product information selected in the selection unit,
wherein the storage unit stores display rule information identifying a product allowed to be displayed on the shelf, and
wherein the selection unit selects product information of a product, from among multiple potential products smaller than the size of the empty space of the shelf, the selected product identified as being allowed to be displayed on the shelf from the display rule information.

13. An augmented reality information processing terminal having an imaging unit and a display unit, the terminal comprising:
a determination unit determining a shelf from image information of contents of imaging in the imaging unit and determining a size of an empty space of the shelf;
a request unit sending a request, including information of the size of the empty space of the shelf determined in the determination unit, for obtaining product information indicating a product which can be displayed on the shelf to an information processing apparatus selecting product information of products smaller than the size of the empty space of the shelf from a storage unit storing a plurality of sets of product information indicating a product and size information indicating a size of the product in association with each other; and
a display control unit displaying product information, included in a reply sent from the information processing apparatus in response to the request, on the display unit in a manner of overlaying on image information imaged by the imaging unit,
wherein the storage unit stores display rule information identifying a product allowed to be displayed on the shelf, and
wherein the product information is selected, from among multiple potential products smaller than the size of the empty space of the shelf, the selected products identified as being allowed to be displayed on the shelf from the display rule information.

14. An augmented reality providing method in an augmented reality providing system including an information processing terminal having an imaging unit and a display unit and an information processing apparatus which are communicable with each other, the method comprising:
sending by the information processing terminal a request including image information of contents of imaging in the imaging unit to the information processing apparatus;
determining by the information processing apparatus a shelf from the image information included in the request and determining a size of an empty space of the shelf;

selecting by the information processing apparatus product information of products smaller than the size of the empty space of the shelf determined in the determining step, from a storage unit storing a plurality of sets of product information indicating a product and size information indicating a size of the product in association with each other;

sending by the information processing apparatus a reply including product information selected in the selecting step to the information processing terminal; and displaying by the information processing terminal product information, included in a reply sent from the information processing apparatus in response to the request, on the display unit in a manner of overlaying on image information imaged by the imaging unit, wherein the storage unit stores display rule information identifying a product allowed to be displayed on the shelf, and wherein the product information is selected, from among multiple potential products smaller than the size of the empty space of the shelf, the selected products identified as being allowed to be displayed on the shelf from the display rule information.

15. The augmented reality providing method according to claim 14, wherein the contents of imaging comprise an image of a product shelf, and wherein the product information comprises a product image for overlaying the product information on the image information at a position matching the empty space of the shelf.

16. An augmented reality information processing method, comprising:

determining a shelf from image information of contents of imaging in an imaging unit sent from an information processing terminal having the imaging unit and a display unit for displaying product information in a manner of overlaying on image information imaged by the imaging unit and determining a size of an empty space of the shelf;

selecting product information of products smaller than the size of the empty space of the shelf determined in the determining step, from a storage unit storing a plurality of sets of product information indicating a product and size information indicating a size of the product in association with each other; and sending to the information processing terminal a reply including product information selected in the selecting step, wherein the storage unit stores display rule information identifying a product allowed to be displayed on the shelf, and wherein the product information is selected, from among multiple potential products smaller than the size of the empty space of the shelf, the selected products identified as being allowed to be displayed on the shelf from the display rule information.

17. An augmented reality information processing method executed by an information processing terminal having an imaging unit and a display unit, the method comprising:

determining a shelf from image information of contents of imaging in the imaging unit and determining a size of an empty space of the shelf;

sending a request, including information of the size of the empty space of the shelf determined in the determining step, for obtaining product information indicating a product which can be displayed on the shelf to an information processing apparatus selecting product information of products smaller than the size of the empty space of the shelf from a storage unit storing a plurality of sets of product information indicating a product and size information indicating a size of the product in association with each other; and displaying product information, included in a reply sent from the information processing apparatus in response to the request, on the display unit in a manner of overlaying on image information imaged by the imaging unit, wherein the storage unit stores display rule information identifying a product allowed to be displayed on the shelf, and wherein the product information is selected, from among multiple potential products smaller than the size of the empty space of the shelf, the selected products identified as being allowed to be displayed on the shelf from the display rule information.

18. An augmented reality computer program product, comprising:

a non-transitory computer-readable medium comprising instructions executable by a computer to function as:

a determination unit determining a shelf from image information of contents of imaging in an imaging unit sent from an information processing terminal having the imaging unit and a display unit for displaying product information in a manner of overlaying on image information imaged by the imaging unit and determining a size of an empty space of the shelf;

a selection unit selecting product information of products smaller than the size of the empty space of the shelf determined by the determination unit, from a storage unit storing a plurality of sets of product information indicating a product and size information indicating a size of the product in association with each other; and a reply unit sending to the information processing terminal a reply including product information selected in the selection unit, wherein the storage unit stores display rule information identifying a product allowed to be displayed on the shelf, and wherein the selection unit selects product information, from among multiple potential products smaller than the size of the empty space of the shelf, the selected products identified as being allowed to be displayed on the shelf from the display rule information.

19. An augmented reality computer program product, comprising:

a non-transitory computer-readable medium comprising instructions executable by a computer having an imaging unit and a display unit to function as:

a determination unit determining a shelf from image information of contents of imaging in the imaging unit and determining a size of an empty space of the shelf;

a request unit sending a request, including information of the size of the empty space of the shelf determined in the determination unit, for obtaining product information indicating a product which can be displayed on the shelf to an information processing apparatus selecting product information of products smaller than the size of the empty space of the shelf from a storage unit storing a plurality of sets of product information indicating a product and size information indicating a size of the product in association with each other; and a display control unit displaying product information, included in a reply sent from the information processing apparatus in response to the request, on the display unit in a manner of overlaying on image information imaged by the imaging unit, wherein the storage unit stores display rule information identifying a product allowed to be displayed on the shelf, and wherein the product information is selected, from among multiple potential products smaller than the size of the empty space of the shelf, the selected products identified as being allowed to be displayed on the shelf from the display rule information.

* * * * *

UNITED STATES PATENT AND TRADEMARK OFFICE
CERTIFICATE OF CORRECTION

Page 1 of 1

PATENT NO. : 8,982,155 B2
APPLICATION NO. : 13/504457
DATED : March 17, 2015
INVENTOR(S) : Tetsuji Fukushima It is certified that error appears in the above-identified patent and that said Letters Patent is hereby corrected as shown below:

On the title page

Inventors read:

(75) Inventors: Tetsuji Fukushima, ~~Toko~~ (JP); Shigeo Kuwabara, Tokyo (JP): Satoshi Yokoi, Tokyo (JP); Noboru Ihara, Tokyo (JP)

Should read:

(75) Inventors: Tetsuji Fukushima, <u>Tokyo</u> (JP); Shigeo Kuwabara, Tokyo (JP): Satoshi Yokoi, Tokyo (JP); Noboru Ihara, Tokyo (JP)

Signed and Sealed this
Twenty-third Day of June, 2015

Michelle K. Lee
*Director of the United States Patent and Trademark Office*